United States Patent
Lewis

(10) Patent No.: US 9,053,494 B2
(45) Date of Patent: **\*Jun. 9, 2015**

(54) SYSTEM FOR DATA MANAGEMENT AND ON-DEMAND RENTAL AND PURCHASE OF DIGITAL DATA PRODUCTS

(71) Applicant: Customedia Technologies, LLC, Santa Rose Beach, FL (US)

(72) Inventor: William Henry Lewis, Santa Rosa Beach, FL (US)

(73) Assignee: CUSTOMEDIA TECHNOLOGIES, LLC, Santa Rosa Beach, FL (US)

( * ) Notice: Subject to any disclaimer, the term of this patent is extended or adjusted under 35 U.S.C. 154(b) by 40 days.

This patent is subject to a terminal disclaimer.

(21) Appl. No.: 14/158,812

(22) Filed: Jan. 18, 2014

(65) Prior Publication Data

US 2014/0136325 A1    May 15, 2014

Related U.S. Application Data

(63) Continuation of application No. 10/848,238, filed on May 18, 2004, now Pat. No. 8,719,090, which is a continuation of application No. 09/383,994, filed on Aug. 26, 1999, now abandoned, which is a continuation-in-part of application No. 08/873,584, filed on Jun. 12, 1997, now abandoned.

(51) Int. Cl.
*G06Q 30/00* (2012.01)
*H04N 21/47* (2011.01)
(Continued)

(52) U.S. Cl.
CPC ........ *G06Q 30/0255* (2013.01); *G06Q 30/0225* (2013.01); *G06Q 30/0235* (2013.01); *G06Q 30/0241* (2013.01); *H04N 5/44* (2013.01); *H04N 5/76* (2013.01); *H04N 5/765* (2013.01); *H04N 5/775* (2013.01); *H04N 7/0887* (2013.01); *H04N 7/16* (2013.01); *H04N 9/7921* (2013.01);
(Continued)

(58) Field of Classification Search
CPC .......... G06Q 30/0251; G06Q 30/0269; H04N 21/2668; H04N 21/472; H04N 21/44222
USPC ............ 705/14.49, 14.66; 725/35, 58, 60, 61, 725/86
See application file for complete search history.

(56) References Cited

U.S. PATENT DOCUMENTS 5,600,364 A    2/1997   Hendricks et al.
5,721,827 A *  2/1998   Logan et al. .................. 709/217
(Continued)

OTHER PUBLICATIONS

Definition of "storage location", Microsoft Press Computer Dictionary, 3rd Ed. (Redmond, Washington: Microsoft Press, 1997).*

*Primary Examiner* — Donald L. Champagne
(74) *Attorney, Agent, or Firm* — Braxton, Hilton & Perrone, PLLC

(57) ABSTRACT

A system for handling data and transactions involving data through the use of a virtual transaction zone, which virtual transaction zone removes the dependency of such transaction on the delivery medium of the product. The invention may reside and operate on a variety of electronic devices such as televisions, VCRs, DVDs, personal computers, WebTV, any other known electronic recorder/player, or as a stand alone unit. The transaction zone also provides a mechanism for combining mediums, data feeds, and manipulation of those feeds. The transaction zone also provides a mechanism for controlling the content, delivery, and timing of delivery of the end consumer's product.

65 Claims, 20 Drawing Sheets

(51) Int. Cl.
  *H04N 21/44* (2011.01)
  *H04N 7/26* (2006.01)
  *G06Q 30/02* (2012.01)
  *H04N 5/44* (2011.01)
  *H04N 5/76* (2006.01)
  *H04N 7/088* (2006.01)
  *H04N 7/16* (2011.01)
  *H04N 21/2543* (2011.01)
  *H04N 21/278* (2011.01)
  *H04N 21/432* (2011.01)
  *H04N 21/433* (2011.01)
  *H04N 21/462* (2011.01)
  *H04N 21/4627* (2011.01)
  *H04N 21/475* (2011.01)
  *H04N 21/658* (2011.01)
  *H04N 5/765* (2006.01)
  *H04N 5/775* (2006.01)
  *H04N 9/79* (2006.01)

(52) U.S. Cl.
  CPC ......... *H04N21/2543* (2013.01); *H04N 21/278* (2013.01); *H04N 21/4325* (2013.01); *H04N 21/4331* (2013.01); *H04N 21/4334* (2013.01); *H04N 21/4622* (2013.01); *H04N 21/4627* (2013.01); *H04N 21/4751* (2013.01); *H04N 21/4753* (2013.01); *H04N 21/6581* (2013.01)

(56) References Cited

U.S. PATENT DOCUMENTS

| | | | |
|---|---|---|---|
| 5,758,257 A * | 5/1998 | Herz et al. | 725/116 |
| 6,876,974 B1 * | 4/2005 | Marsh et al. | 705/14.44 |
| 8,484,677 B1 * | 7/2013 | Eldering et al. | 725/35 |
| 2004/0123323 A1 * | 6/2004 | Russo | 725/88 |

* cited by examiner

Transaction Menu

| Selections | Price | R/O |
|---|---|---|
| Star Wars | 4.99 | R |
| Die Hard | 3.99 | R |
| Dr. Doolittle | 19.95 | P |
| Jaws | 13.99 | P |
| Total | 42.92 | |

Payment Method:

| | Acct. No. | Exp. |
|---|---|---|
| Visa/MC | | |
| AMEX | | |
| Debit Card | | |
| Other | | |

FIG. 3C

Function Menu

Record Movie
Play Movie
Download Movie
Upload Movie
Erase/Auto Return
Custom Edit
Condense
Store in Data Box
Other

FIG. 3D

Record Operations

1. Auto-Record by:
    a. Content Filter
    b. DMS Program Guide
    c. Auto Clock Timer
    d. VCR Plus
    e. T.V. Guide Plus
    f. Other 2. Re-Recording
    a. Custom Edit
    b. Assign Data Box
    c. To Portable 3. Continuous Loop
    a. Main Storage
    b. Data Box
    c. Auto Timer

FIG. 3E

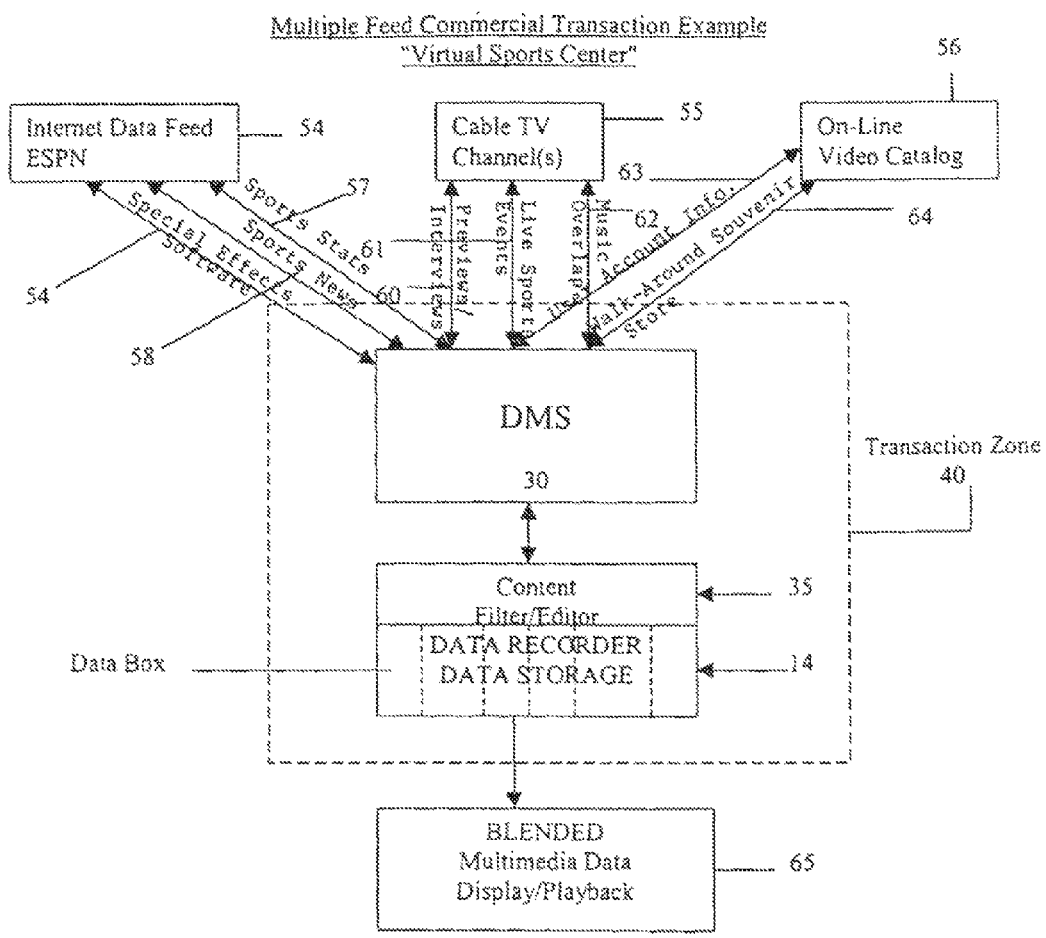

SYSTEM FOR DATA MANAGEMENT AND ON-DEMAND RENTAL AND PURCHASE OF DIGITAL DATA PRODUCTS

CROSS-REFERENCE TO RELATED APPLICATIONS

This application is a continuation of prior U.S. patent application Ser. No. 10/848,238, filed May 18, 2004, which is a continuation of U.S. patent application Ser. No. 09/383,994 filed on Aug. 26, 1999, which is a continuation-in-part of U.S. patent application Ser. No. 08/873,584 filed Jun. 12, 1997, each of which is incorporated by reference herein in its entirety.

FIELD OF THE INVENTION

The present invention relates to a data handling system for the management of data received on one or more data feeds. More specifically, it relates to a method for management, storage and retrieval of digital information and an apparatus for accomplishing the same. Even more specifically, it relates to a method and system for selecting, receiving and manipulating data products that may be transferred to a portable storage device for use with existing playback systems. Even more specifically, it relates to a system for renting or purchasing data products for immediate, on-demand delivery, which may be formatted and transferred to a portable medium for use in any existing playback device.

DESCRIPTION OF THE PRIOR ART

For the past several years the world has experienced what has been termed an information explosion. Innumerable, varying technologies have arisen in an attempt to manage this flow of information in commercial areas. Examples range from the various protocols and configurations used for managing office local area networks (LANs) and the information that flows over them, to low end hand-held personal organizers.

A new area is finally reaching a point of no return in this world of information overload: the end user of commercial and educational material. This information overload has now become critical with the end users of computers and televisions. This, in turn, creates problems relating to the management of the exponentially increasing global database of information available over data feeds to personal computers, such as the Internet and other modem and cable accessible computer data feeds. It also includes the explosion in data feed sources over and through program broadcasts such as network television, radio, cable television channels; satellite feeds, UHF/VHF channels, videotapes, and even the Internet. Couple this explosion of information with a blurring line between the personal computer, the television, and telephone communications. It is apparent that there is a serious need for an integrated system that manages and handles the growing amount of information available over the various data feeds and can meet the needs and desires of the end user.

In particular, this increasing array of data, data sources, and storage devices has resulted in numerous battles over the format in which the data is delivered and manipulated. For example, one of the more recent format battles is being played out over the fixture format for purchases of video products and music and other sound recordings, i.e., Digital Video Express ("Divx") versus digital video disc ("DVD"); compact discs ("CD") versus digital audio tape ("DAT") versus cassette modes. Yet another example is the battle over which medium, PC's or televisions, will eventually triumph in being the delivery channel for all of this information. Another issue arises when discussing the conduit for receiving the information being provided to end-users.

Regardless of the format of delivery, manipulation processing, storage or play back, there are limitations on the devices utilized to manage the ever increasing and, now in many cases, overlapping information data feeds provided over computer-received and television/radio-received data feeds. Previous attempts to solve the problems caused by this plethora of information, the ability to access this information through different sources, and different methods of storing the data have not solved some of the basic issues surrounding this technology such as timing, commercial transfer and licensing issues as well as security for the person transferring the information.

The creation of new methods of transferring, storing, manipulating and accessing such data do not solve the problems outlined herein. In a sense, prior attempts to provide solutions have focused on the technology of retrieving, storing, or playing back or viewing of the data with a minor emphasis if at all on the overall management of the data. In many instances, the new technology "solution" creates a new format dilemma.

For example, the new Divx video format creates another layer of technology that consumers must purchase to play the video on this new format. Under this format, consumers may purchase a small, compact disc-like medium containing a digital video product in a restrictive, special, non-universal format such as DVD, for a nominal price. The disc is encoded in the Divx format to prevent playing on regular DVD players. However, the disc may be placed in a Divx player that presents the consumer a series of options, including renting or purchasing the video product. Each Divx disc has Divx "control data," including an individualized serial number, which the player reads the first time the disc is inserted and then stores in a memory on the player. Information on the disc and on the player is then used to determine the appropriate price for the movie. When the customer begins playing a movie, the viewing period for that copy of the movie begins. More specifically, the player allows the disc with that particular serial number to be played for a set length of time (which is also stored in secure memory on the player). During this set length of time, the customer may view the movie as many times as desired, but only on this Divx machine. An on-board modem calls the Divx network on a regular schedule for billing purposes, and to refresh existing information on the player. However, Divx is limited in that a disc enabled by one player cannot be played in any other Divx player without re-enabling the disc, or making arrangements through the Divx company to transfer your account to another box. Thus, a video rented or purchased and usable on one Divx machine is useless in another Divx machine or any other kind of player without incurring the time and trouble of dealing with Divx account customer service. Additionally, if Divx technology is accepted, it will render obsolete large collections of video on other media such as DVD, laser disc, and videocassette tapes.

Recently, electronic commerce has blossomed on the Internet. The solution for commerce to date has been to have the user access the web site of the commercial vendor and browse through the items available and then order those items for delivery via delivery service when ordering goods or in some instances downloading the purchase immediately. This results in piecemeal transactions over a variety of formats and protocols. Even attempts by the on-line service providers to provide groupings of products and services still requires access to their respective systems.

A comprehensive data management system is needed that forms a transaction (or commercial) zone where and through which data can be selected, purchased or rented, received, stored, manipulated, and downloaded by a user and then downloaded to ultimate storage or use. Utilization of such a system removes the battle over which storage format, delivery system or platform is used and provides the consumer of the information age with data access and manipulation without issues of format compatibility and timing. This same system also interfaces with current financial tools such as credit cards, checking accounts, ATM accounts, and other debit and credit systems to provide easy rental or purchase access. Such a data management system, in effect, separates the distribution media from the storage media.

The current invention solves these problems through the use of an integrated information management and processing system that provides for the handling, sorting and storage of large amounts of data that is a user-defined and user resident environment. It allows this management to occur both during and after the actual feed is being received, while also allowing various decisions to be made about the suitability, quality, and other content of the information being received. The invention also has the capability to be securely accessed and utilized from a remote location, including telephone, Internet, and remote computer/television access. This would allow services to provide virtual user transaction zones.

SUMMARY OF THE INVENTION

An object of this invention is to provide a system that creates a transaction or commercial zone for data to be received, manipulated, stored, retrieved, and accessed by a user, utilizing one or more data feeds from various sources. The system also creates unique arrangements of information or selections of information from distinct user-defined criteria.

Another object of the invention is to provide a system for intermediate service providers to manipulate and repackage data and information for end users in a streamlined, comprehensive package of information.

A further object of this invention is to provide a system for the electronic delivery of data for commercial or other types of communication that can also serve as an electronically based payment system for same.

A further object of this invention is to provide a single integrated system and device with a user-friendly control interface which permits the end user to efficiently and effectively manipulate and manage data feeds.

A further object of this invention is to provide a system and device for spontaneously and automatically capturing and manipulating large amounts of data for both real time playback, and for storing the captured data for subsequent playback without the need for having a readily available, movable, blank storage device.

Another object of this invention is to provide a system and device for spontaneously and automatically capturing and manipulating electronic data, either continuously or at specified times, both for real time playback, and for storage for subsequent playback, without the need for having a readily available, movable, blank storage device, and which can be programmed from a remote location.

Another object of this invention is to provide a system and device for capturing, manipulating and storing open digital audio, video and audio/video data to a built-in storage device, and for transferring the data to a selectable portable storage device. This is accomplished while incorporating digital copyright protection to protect he/she artist's work from unlawful pirating. Media formats include data that is scrambled or encrypted, or which is written on disks and devices designed to be compatible with the Data Management System of the present invention.

Other objects of the present invention include:

The use of data boxes to personalize programming to the individual taste of the user.

Rent/lease storage space in users Data Box to personalize and target advertising to the individual preferences of the user.

Purchase or rent data products (movie, TV show, etc.) even after real time broadcast.

In a preferred embodiment of the invention, a digital data management system includes a remote Account-Transaction Server ("ATS"), and a local host Data Management System and Audio/Video Processor Recorder-player ("VPR/DMS") unit. The ATS may be local or placed at the content broadcaster's site. The ATS stores and provides all potential programming information for use with the local VPR/DMS unit. This includes user account and sub-account information, programming/broadcast guides, merchandise information. It may also include data products for direct purchase and/or rental from on-line or virtual stores, and has interfaces with billing authorities such as Visa, MasterCard, Discover, American Express, Diner's Club, or any other credit card or banking institution that offers credit or debit payment systems. The local VPR/DMS unit comprises at least one data feed which includes an interface to the ATS; at least one receiver/transmitter unit for receiving information from a data provider or the ATS, and for transmitting information to the remote ATS; and a plurality of data manipulation and processing devices. These devices may include, but are not limited to, digital signal processors, an automatic discretionary content filter/editor, a V-chip or other such content or ratings-based "content blocker, analog-to-digital converters, and digital-to-analog converters; a one or more built-in, non-movable storage devices; one or more recording units; a microprocessor, a user interface; and a playback unit. The VPR/DMS queries the ATS at regular intervals to obtain the latest broadcast, programming and merchandise information. Upon user request, a program running on the VPR/DMS creates a virtual "Transaction Zone", whereby the information received from the remote ATS (or from a direct broadcast) is configured in a graphical, hierarchical set of menus. These menus allow the user to access a variety of functions and/or program the VPR/DMS to record scheduled broadcasts or to directly rent or purchase data products.

The local VPR/DMS unit acts as the interface between the data products from the broadcaster/content provider, the ATS, and the end user. The VPR/DMS may be used in a variety of ways, including, but not limited to, a virtual audio/video recorder/player for recording and playback of scheduled broadcast programs; an audio/video duplicating device for capturing, manipulating and storing audio/video programs from other external audio/video sources; or as an interface to a "virtual store" for purchasing and/or renting audio/video products or computer software on demand. The VPR/DMS may also be used in a combination device, such as a TVCR, or as a separate component linking any well known audio or video device to a plurality of input sources.

Audio/video or other data may be received on the data feed lines at the receiver unit. For example, a cable television broadcast may be received on a cable television broadcast feed at a CATV receiver located in the receiver unit (notice, that likewise, a satellite television, digital go cable, or even a UHF/VHF signal may be received, depending on the type of television connection used). Once the data has been received, it may be converted to digital form (if not already in digital form), compressed and immediately stored on the built-in storage device. For example, the analog or digital TV signal may be converted to mpeg-2 format (the standard used on DVD) and stored on the internal storage device preferably a HDD or RAM optical disk, as is well known in the art. Following storage, user-controlled programming features determine whether or how the digital data will be processed upon playback.

In a preferred embodiment of the invention, the built-in storage device of the VPR/DMS is such that it allows stored data to be accessed as soon as it is stored. This provides for the ability to watch and store a program virtually in real time. As the broadcast program is received it is converted to digital form, stored on the built-in storage device, read from the storage device, processed by the processing circuit, and played back through the playback circuitry and output to an attached television. This operation is similar to recording a television show with a VCR while viewing the program. However, the invention provides the ability to pause, freeze frame, stop, rewind, fast forward or playback while it continues to record the remainder of the show in real time as it is broadcast.

For example, a user may be watching a television show in real time while the VPR/DMS records and processes the broadcast when his viewing is interrupted by a knock at the door. Rather than waiting for the show to finish recording before he/she can go back and see the portion of the program missed by the interruption, the user may pause the simultaneous broadcast/playback while the VPR/DMS continues to record the remainder of the program. Later, he/she can return to a precise cue point marker where the interruption occurred, and continue watching the show, even as the VPR/DMS continues to record the broadcast. In addition, he/she may rewind, fast forward through commercials, watch in slow motion, or perform any other VCR-like function, even while the VPR/DMS continues to record a broadcast. Thus, the system provides a means by which the user may seamlessly integrate real time with delayed playback.

The VPR/DMS also provides a means by which the user may program the local host receiver/player to automatically record certain programs, or other data from specific data deeds. For example, when used as a recording unit to record preferred broadcasts, the user may program the local host/receiver unit to record according to specific times via a built-in auto-clock timer. It may also record specific programs, in much the same way that current VCR technology allows users to manually set recording times, or even program-specific recordings (e.g., VCR+, or TV Guide Plus). However, the preferred embodiment makes significant improvements over the manual timer or VCR+ type recording methods by allowing the user to personalize his or her own parameters for recording broadcast programs. In addition to manual timer recording and VCR+ technology, the system includes a built-in automatic discretionary content filter/editor. This content filter/editor allows a user to program the unit to automatically record broadcast content by selection of a "User Suitability Criteria", which may be defined as a program name, theme, genre, favorite actors or actresses, directors, producers or other parameters, such as key words, television/motion picture rating, etc. The User Suitability Criteria may be used alone or in combination, and can be used to either select or prohibit programming to be recorded. On demand, the VPR/DMS will automatically select, according to the User Suitability Criteria input, from among available programs according to a broadcast programming guide provided by the remote ATS, and will be automatically be configured to receive and record programs in accordance with the required parameters. Additionally, the broadcast signal may be supplied with digital control data recognizable by the VPR/DMS.

For example, a user may program the VPR/DMS to selectively and automatically record all broadcast programs in which a particular actor appears. The VPR/DMS will examine the latest programming control data provided by the ATS, recognize programming selection, and automatically configure itself to record the programs in which that actor appears. The system provides the additional benefit of never having to be reprogrammed unless the user desires. For example, if a user has a favorite weekly television show that he/she would like to record, the system may be configured so that every week, it automatically records that show without having to be reprogrammed. However, the VPR/DMS configures itself based on User Suitability Criteria apart from just the program time selection of prior art video recorders. It searches the programming guides for titles, actors, ratings or other User Suitability Criteria, and only records those programs meeting the programmed parameters. Thus if the user's favorite show is preempted in favor of a special program, the system's programming will read the broadcast control data, understand that the program has been preempted and not record at the normally scheduled time.

Additionally, the VPR/DMS may be programmed according to individual, non-related parameters so that multiple programs may be recorded. For example, an adult family member may program the VPR/DMS to record all broadcasts in which a particular actor appears, while another family member, say a child, may program the VPR/DMS to record all programs in which a different actor appears. A single user may also set up multiple individual recording parameters as well. This is accomplished by the creation of individual virtual "Data Boxes" or "personalized custom channels", which may be created for each user. Real time recording and playback or selection of future manual or auto-recordings which flow into the individual Data Boxes may be accomplished based on the User Suitability Criteria. Individual criteria may be completely separate or related to other more system-wide criteria.

Like VCR's, audio tape players, recordable compact disk units and other well known equipment, the invention can capture audio/video data output from other consumer electronics equipment in addition to recording broadcasts or retrieving information. A consumer may connect the VPR/DMS to a consumer electronic device such as a TV, video tape recorder, compact disc player, audio tape player, DVD player, or any other known digital or analog audio/video data player/recorder and record audio/video information directly to the built-in storage device. The VPR/DMS may also be connected to TV antennae, TV cable, or satellite dish receiving systems to receive broadcast media. It may also be attached to the Internet whereby the consumer can retrieve data from a desired website.

For those players like DVD players, CD recorder/players and minidisc recorder/players having digital inputs and outputs, the VPR/DMS incorporates the ability to receive, store, encode, decode and output digital information in these formats. For example, a user may connect the digital output of a CD player or a minidisc player to a digital input on the VPR/DMS. The VPR/DMS may receive and store the digital CD or minidisc data onto the built-in storage device for subsequent use. In the same respect, the user may connect the digital output of the VPR/DMS to the digital input of a CD-recordable or minidisc player, and transfer digital data stored on the built-in storage device to a CD or minidisc. With the advent of DVD-RAM and DVD-recordable, both of these options are also available with regard to video, as well as audio data. In any event, the capability of the VPR/DMS to receive and store data from both content providers and other consumer electronic devices, as well as its ability to output both digital and analog data is instrumental in its multitude of uses, including the virtual rental/purchase options.

A variation of the invention offers content providers the capability of direct instant delivering multi-formatted programs (movies, direct Compact Disc or other audio medium, video catalogs, etc.). The data management zone (or ring) would allow for rental (limited use) or purchase to home based or business based customers. It effectively eliminates need for transporting, inventorying, and physical delivery of digital data products. Direct data rental or purchase provides far more convenience, data security, versatility, cost effectiveness, technical quality, accessibility, product variety, product durability (no broken tapes or damaged compact discs) anti-piracy protection, various preview/rental/purchase options, secure transactions, auto return (no late fees), user privacy, etc. It also provides the added benefit to the rental industry of reducing or eliminating retail space and physical inventory.

Under the virtual rental/purchase store, the user has several options. He may choose from products listed in an electronic catalog which is either downloaded from the remote ATS, or received via direct broadcast feed. He may set the content filter/editor to automatically record data. In either case, the data from which is stored on the local VPR/DMS. The VPR/DMS unit interfaces with the ATS to establish two-way communication with a broadcaster/content provider and update itself at regular intervals, providing the home user with the latest available rental/purchase information. For example, the user may browse through available movie titles, audio titles and software titles to select a particular product she would like to purchase or rent. The local VPR/DMS obtains the necessary information from the user to identify the selected product; retrieves stored or spontaneously entered billing information, and then transmits the information to the remote ATS. The remote ATS receives the requested information, and validates the user's account and billing information. It then electronically negotiates the purchase or rental from the content provider, and configures the local VPR/DMS to connect to and receive the requested data from the content provider either on-demand or via a broadcast schedule.

In one type of purchase transaction, the data is received and stored on the built-in storage device where it may be accessed for processing, playback or transfer to other media. The data may be received in a scrambled or encrypted format, and may have either content or access restrictions, but also may be provided without restriction. For example, in a rental or purchase transaction, the remote ATS, the local VPR/DMS, (or both) retain rental control information, which is monitored by the broadcaster/content provider, to restrict the use of downloaded data past the or prior to negotiated rental period. For example, control data indicating rental restrictions for a particular title may be stored by the VPR/DMS upon receipt of the digital data product (i.e., movie, pay TV show, music album, etc.) from a content provider. Once receipt of the data is acknowledged by the VPR/DMS and the transaction is completed, the user may play back the data product, store it, or transfer it to portable medium for use on a stand alone playback unit (e.g., DVD player, VCR, etc.) provided all necessary transactions are completed. If the data product is stored in scrambled form, an authorization "key code" must be received from broadcaster/content provider to unlock the rented or purchased program by use of a built-in data descrambler device.

In order to avoid late charges or fees for rental transactions, the user must "return" the data product by selecting a return option from the electronic menu. The VPR/DMS interfaces with the ATS to negotiate the "return", and the data product is erased from the VPR/DMS storage device or re-scrambled (authorization key voided, where the data product remains stored for future access/rental/purchase). The data product has been transferred to portable medium; the control data keeps a record of such transfer, and requires the portable medium to be erased before successfully negotiating the "return." In this way, the system is programmable by the end user and broadcaster/content provider to enact a "virtual return" of data products stored on the non-moveable storage device.

In a preferred embodiment, the user may program the system to process the received data according to the User's Suitability Criteria. For example, the system may be preset to automatically filter, edit, record or not record all or any part of the content of the data based on User's Suitability Criteria, by interpreting control data encoded into a broadcast signal. The data may otherwise be stored in a ROM, PROM, or on a portion of the built-in non-movable storage device reserved for such control information. The V-chip, which is well known, merely blocks out entire programs that are considered "unsuitable". The present invention may include, as part of the microprocessor, a processing device or circuitry which automatically edits the received data according to the User's Suitability Criteria to omit portions of a received program that may be considered unsuitable. The content that is received from the broadcaster/content provider is sent to a processing circuit, which includes a signal processor for decoding control data that is included in broadcast signals. Alternatively, this content may be stored in a ROM, PROM, or a portion of the built-in non-movable storage device reserved for such control information, and which is used for determining whether or how the program or data product will be processed by the content filter/editor. Processing may include recording, editing, condensing, rearranging data segments, displaying, or otherwise customizing the content. This is especially useful when the User Suitability Criteria is a ratings based edit. The processor decodes the received content, interprets the control information, updates the previously stored control information, and then automatically edits the signal to censor unsuitable content (e.g., bleep out expletives, or eliminate scenes involving nudity or graphic violent or sexual content). The processed data may then be played back though the playback unit in real time and/or sent to the recording unit to be recorded onto the non-movable storage device for later access, editing, and/or playback by the playback unit.

In a further preferred embodiment, the user may program the system to capture digital data products (data) from a plurality of broadcast channels or other data feeds at the same time. A microprocessor in the system may is controlled by the broadcaster/content provider and the end user. This microprocessor has software programming to control the operation of the processing circuitry and the playback circuitry. The software programming interacts with the built-in, non-movable storage device and the playback apparatus to allow recording and processing of the digital data products as they are broadcast from several channels simultaneously. The software programming further interacts with the playback circuitry to allow the data to be played back to a cue point, which is registered within the system's memory. It may be paused on command, and restarted and played back from the cue point, while the data are being continuously recorded without interruption. This allows the user to view, pause, and restart a program at his discretion while the program is still being recorded.

The data may be subject to either pay per view, purchase or rental restrictions by the digital data product provider. When this occurs, the data is still received and recorded, but in a format that prohibits viewing by the user until the commercial transaction has been completed. The data may be scrambled, encrypted, or otherwise locked from viewing or playback (audio) until the user agrees to pay for access. However, since the data is already stored on the users local VPR/DMS, the commercial transaction may take place locally on the VPR/DMS, or on a remote ATS. When the user decides to obtain the data, the digital data product provider exchanges an electronic access key to the scrambled, encrypted, or otherwise locked data in exchange for agreement to his commercial terms.

By way of example, the user may come home only to find that his or her premium program of choice started 15 minutes prior to his arrival. In all known prior art devices, the program in this instance would be missed. However, because the user pre-programmed the system to capture either a broad band of programming, or specific selections during the period before the program started, the entire program is still instantly accessible, even while the program is still recording. If required, an access key may be obtained allowing the user convenient and discretionary viewing privileges. Additionally, programs that have been completely recorded earlier may be rented or purchased in this fashion as well. If the scrambled or encrypted digital data isn't accessed from the recorder during a user definable time, the system may record over it later.

In another variation of this invention, the system may be equipped with password protection that serves multiple purposes. First, the password protection limits the utilization of the device to authorized users of the system that have valid passwords. Second, the system may be programmed by an administrator (e.g., a parent) to automatically assign certain processing functions to specific passwords, prohibit certain processing functions from being utilized by specific passwords, or to make certain functions optional according to the administrator's objectives. For example, a parent may program the system to assign an automatic censoring, or editing function to a child's password in order to limit the content that child may view. Consequently, when the child enters his/her password in order to gain access to the system, all data to which the child has access (whether it be real time viewing or previously recorded data) will be automatically edited to screen cut unsuitable material as described above.

The creation and use of the virtual individual "Data Boxes" or "custom channels", is especially useful in the present invention. User suitability criteria unique to each data box address may be either completely separate or related to other system-wide criteria. This enables content stored to a first data box to be uniquely configured from second or subsequent data boxes. These Data Boxes may be accessed only by means of a unique password specific to the data box, of the built-in, non-movable storage device. In this manner, the present invention provides for multiple users to have, not only unique processing functions assigned to their accounts based on their password, but also to enjoy storage space to which other passwords have no access. For example, this feature allows parents to have greater control over the programming that may be accessed by their children.

The system may also include the ability to add copyright protection to digital data in order to protect copyright holders from unauthorized duplication by intellectual property pirates. For example, Macrovision Corporation offers methods and systems for encoding data on a digital medium which causes disruption during recording from the digital medium to another analog or digital medium and causes the recorded resultant product to be of such poor quality, that it is not commercially useable. Similarly, minidisc and CD players use a system called Serial Code Management System ("SCMS") which, during digital recording, sets certain control bits to prevent further digital copies from being made from the first generation copy. The VPR/DMS's processing and/or playback circuits may include elements for implementing this or similar copyright protection to the data received from content providers. Open data recorded onto the storage device may be encoded such that first generation copies of sufficient quality for personal use, but that copies of first generation copies are either preventable or of such poor quality that they sufficiently prevent pirating.

It should also be noted that the recording means of the invention, which records data onto the high capacity, non-movable storage device, may be set to record in a continuous loop. This is an advantage over prior art devices, like VCR's, that shut off when its storage device has reached maximum capacity. This function may also be available if the built-in non-movable storage device has been divided into Data Boxes. For instance, a user may record data in a continuous loop to her particular Data Box, writing over the first recorded data when the Data Box reaches its capacity. When recording to a particular Data Box, and its full capacity has been reached, the recording device will record over the first recorded data in that Data Box. This may occur even if the built-in, non-movable storage device still has available space. Continuous loop-recording is useful, because it allows the user to continue to record a broadcast or other program although her storage space has been used up prior to the conclusion of the broadcast or program.

It should be noted that the invention as described herein may be "bundled" with a television set, video cassette recorder, digital video disc player, radio, personal computer, receiver, cable box, satellite, wireless cable, telephone, computer or other such electronic device to provide a single unit device. For example, in the television and video market there exist television/VCR combinations "bundles" which include a television set and a video cassette recorder combined into the same enclosure. The present invention may be combined with a television, a VCR, a TV/VCR combination, DVD, TV DVD combination, digital VCR, or any combination above or with computers to provide a single unit device which allows the user to spontaneously view television broadcasts; VCR (or other such device) movies or programs; or other such programs or data, and to record them without the need for a blank video cassette or other such storage device. Other combinations include: radio, satellite receivers and decoders, "set top" internet access devices, wireless cable receivers, and automobile radio/CD, and data stored on computers. Further, utilizing the claimed invention, the bundled device allows for convenient storage until such time as the user can obtain a blank movable storage device on which to transfer the recorded program.

Another aspect of the present invention is the capability of downloading data products to portable media. The invention is capable of storing, processing, and playback of data products which have been pre-recorded onto any type of portable storage device. In a "commercial based" embodiment a merchant (or distributor), such as BLOCKBUSTER VIDEO may employ a VPR/DMS in a commercial establishment to receive data, edit it customer's User Suitability Criteria, and instantly record the edited version on a portable storage device which then is sold or rented. This enables the merchant to thereby reduce his standing inventory for a given title, yet enables him to retain the data as originally received and produce as many copies as current demand allows. This commercially based VPR/DMS system has all the unique VPR/DMS functions as previously described. Functionally, the commercial based system would be identical to the home based version, except that the recording of the data product would occur by an intermediary prior to rental or purchase by end-user.

Additionally, commercial product distributors or by end-users may utilize "blank" VPR/DMS portable storage media (i.e., CD, DVD, VHS, etc.) which can be produced and pre-formatted at the factory or at the distributor level to include unique VPR/DMS control data and product information data (as described above) for customizing data products, for maximizing unique VPR/DMS recording, processing, and playback functions, or other for use in controlling all rental/purchase transactions described previously.

BRIEF DESCRIPTION OF THE DRAWINGS

FIG. 2b shows a block diagram of one embodiment of the receiver from FIG. 2a.

FIGS. 3a-3i show block diagrams of one embodiment of the invention of on screen menus for commercial renting, leasing, or sales of audio, video, multimedia as well as functional selectivity for recording, editing, and content filtration.

FIG. 9 is a schematic representation of the present invention illustrating the management of multiple feeds of data for commercial transactions.

FIG. 10 is an example of a Master Menu of the present invention for user selection of pathways for receiving data.

FIG. 11 is an example of a Data Fields menu of the present invention for selection of data type to be received.

FIG. 12 is an example of a Combined Data programming menu of the present invention for selection of data to be purchased.

FIG. 14 is a schematic representation of the present invention illustrating how multiple control data channels may be used to control, filter and edit content to be played back.

DETAILED DESCRIPTION OF THE INVENTION

Stand Alone Embodiment

Figure 1:
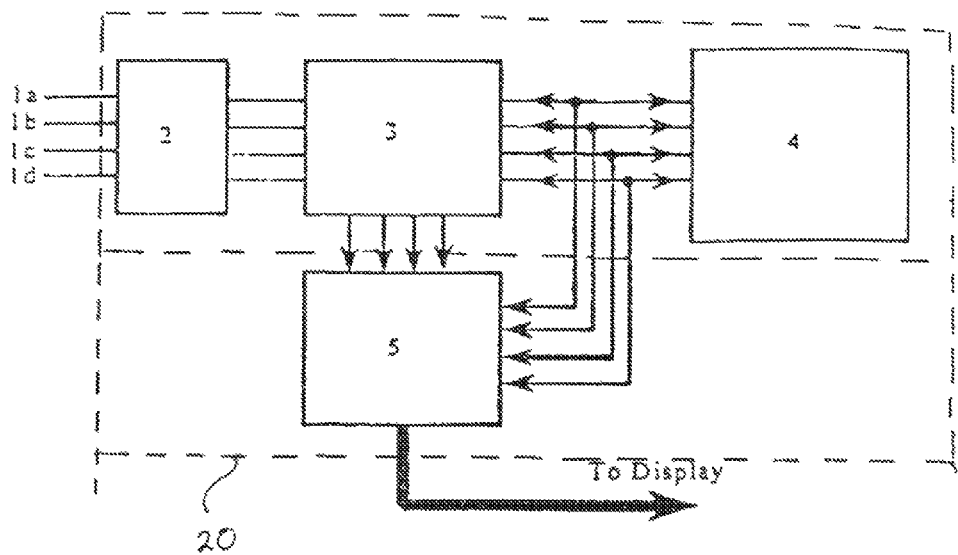
FIG. 1 shows a block diagram of a standalone unit including one embodiment of the invention.

Referring now to FIG. 1, which illustrates a standalone embodiment of the present invention, data feeds 1a-1d carry electronic data from any particular source. This includes, but is not limited to, network television broadcasts, UHF/VHF signal receivers, cable television broadcasts, satellite broadcasts, radio broadcasts, audio, video or audio/video data signals, or computer data signals are received at the receiver 2. The receiver 2 may incorporate a radio or television antenna, cable television receiver, satellite signal receiver, or any other digital or analog signal receiver capable of accepting a signal transmitting any kind of information or programming. Once received, the signal is transmitted to the microprocessor 3 where the information is processed according to user input.

For example, in an information subscription program, users may be required to pay a fee in order to access information for personal use. To enforce the payment of such fees, and to prevent unauthorized access from non-subscribers, the signal may be encoded by the broadcaster, and require some sort of de-scrambler to facilitate access to the information. In the present embodiment of the invention, the microprocessor 3 may include an optional "de-scrambler," among other processing devices, which will decode the broadcast signal so that the information contained therein may be accessed for personal use by the subscriber.

In addition, broadcasters or information providers frequently include information in other coded signals along with the broadcast program that, when separated and decoded, may be utilized by other electronic features that may be present in the system. For example, high-end compact disc players (CD players) often have features that read and decode compact disc information (CD-I) that is included by manufacturers on audio CD's. This information typically contains the name of the CD, the artist, and the name of the songs on each track. Using special signal decoders, these high-end CD players can decode the CD-I information, process it, and display on the player unit's LED display, the name of the CD, the artist, and the particular song being accessed at any given time. The microprocessor 3 of the invention embodied in FIG. 1 includes a signal processor that decodes and processes coded information which may be included in the broadcast or other received signal.

In addition, other processing functions that may be included in microprocessor 3 include a device or circuitry for data compression, expansion, and/or encoding. These features would aid in the system in maximizing transfer rates, maximizing storage efficiency, and providing security from unauthorized access.

The microprocessor 3 is fully programmable to allow the inclusion or exclusion of any and all types of available processing and/or signal decoding. In other words, the type of processing the received signal undergoes in the microprocessor 3 is dependent on the specific desires of the user.

Once the received signal has been processed, it may be stored for future use on the built-in, non-movable storage device 4, or immediately accessed for present use. If needed for present use, the processed data is transmitted from the microprocessor 3 to a playback device 5, which interprets the processed data and prepares it for display. For example, an audio signal is received from a compact disc player at receiver 2, and then processed and decoded by microprocessor 3 so that any audio data is separated from CD-I information on the disc. Once the data has been fully processed in the microprocessor 3, it is sent to the playback device 5 which plays back the audio data through a speaker system and displays the CD-I information on a LED display.

In addition to allowing instantaneous playback of received and processed data, the present invention allows the data to be stored on an internal, non-movable storage device 4 in either processed or unprocessed format. The stored data may be processed and/or displayed later. The preferred non-movable storage device is computer hard drive, but 4 may be any medium known in the art for storing electronic data, including, but not limited to: recordable tape or other analog recording media, CD ROM, optical disk, magneto-optical disc, digital video disc (DVD), and/or digital audio tape (DAT). It is preferred, but not required that the non-movable storage device 4 be one that is erasable so that previously stored programs may be overwritten.

Data from the storage device 4 may be accessed for playback at the playback device 5 or for subsequent processing in the microprocessor 3. This feature is important because it allows a user to record a specific program in its original format for review and subsequent editing to make it suitable for themselves other or users. In a practical application of this feature, a parent can record a cable television program that is unsuitable for children, and store it on the built-in, non-movable storage device 4. He/she may then allow the children to watch a version edited by the microprocessor 3 to make it suitable for child viewers. Such a feature allows for more parental control over the content of programs a child may view. There are many other examples of program customization using User Suitable Criteria and content filter/editor for customizing programs which have been previously recorded in raw or original form.

Television Embodiment

Figure 2A:
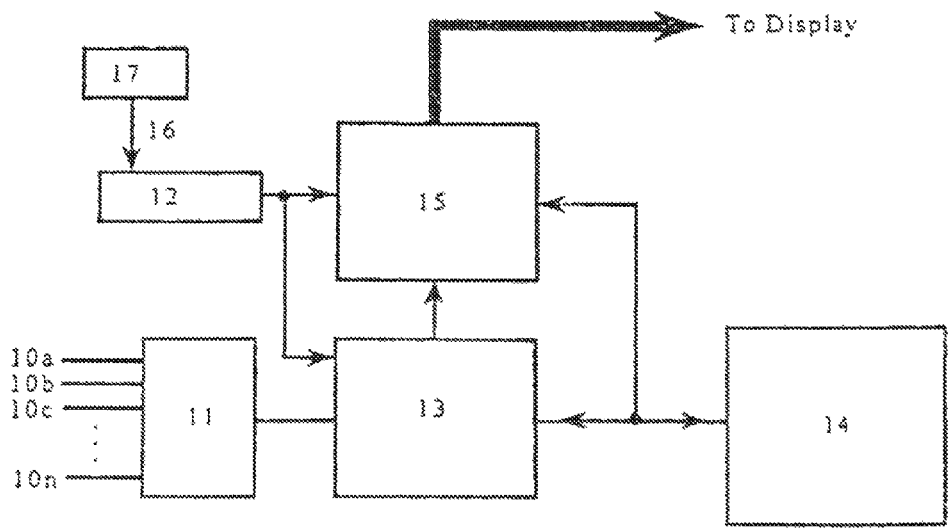
FIG. 2a shows a block diagram of a television unit incorporating one embodiment of the invention.

Referring now to FIG. 2a, which illustrates a television embodiment, the drawing depicts a block diagram of a television incorporating one embodiment of the invention. Data feed lines 10a-10n transmit data from television, cable television, satellite, or UHF/VHF broadcasts or from other local data sources (including VCR's, laser disc players, DVD players, video cameras, or any other audio, video, or combination audio/video (collectively "A/V") data transmitter known in the art to the receiver 11.

FIG. 2b depicts an embodiment of the receiver 11 from FIG. 2a. Receiver 11 may include a combination of one or more receiver interfaces 21-26. Receiver interfaces 21-26 include a network broadcast television antenna; cable television receiver; satellite receiver; UHF/VHF antenna; broadcast radio antenna, and computer network interface. Other embodiments of receiver interfaces 21-26 could include, but are not limited to, standard A/V inputs (e.g., RCA video in and video out, Super VHS, or any other A/V input/output ports known in the art). Receiver interfaces 21-26 are designed to accept the broadcast signals and transmit them to output circuit 27. Output circuit 27 may be a multiplexer, sequencer, delay circuit, or other circuit generally known in the art for handling the flow of multiple output signals for individual processing. In this respect, the multi-functional processing system may process, handle, and operate on one or more input signals simultaneously.

Referring back to FIG. 2a, from the receiver 11, the raw data received from one or more of data feed lines 10a-10n is sent to the processing means 13. The microprocessor 12 controls which processing functions (if any) are applied to the received data. Additionally, microprocessor 12 controls any playback features that are subject to user input (e.g., pause, stop, record, fast forward, rewind, instant replay). The user interface 17 allows the user to directly control which processing functions will be applied to the received data as it is transmitted through the processing means 13. This is accomplished by transmitting a control signal 16 which the microprocessor 12 receives, interprets and uses to control the processing means 13 based on the user's specifications. User interface 17 may include a system for local on screen programming using an infrared or other hand-held remote control device 37 to produce the control signal 16. Alternatively, the user interface 17 may be an on-unit interface featuring control pad buttons which activate the control signal 16 to direct the features of the system. In addition, user interface 17 may include touch tone telephones or software programs utilizing computer modems or other computer ports (e.g., serial, parallel, network card, or any other computer interface known in the art) to generate the control signal 16, and which may be utilized at much greater distances than standard remote control interfaces to control microprocessor 12. User interface 17 may include circuitry, software or any other means known in the art for securely encrypting or encoding control signal 16 to provide safe, secure transmission of the control signal and to prevent unauthorized interception of the control signal 16 and/or access to the system.

Upon user request, microprocessor 12 may deactivate all types of processing so that the raw data received from data feed lines 10a-10n may be stored directly to built-in, non-movable storage device 14 for later processing and/or playback.

Processing means 13 may include any number of circuits, signal processors, filters, or other data manipulation devices known in the art for providing any electronic features or functions that may exist in standard televisions and other such displays known in the art. The microprocessor may also include, but is not limited to, one or more the following processing circuits or devices specifically aimed at: enhancement of picture color, hue brightness, or tint; sound balance; bass and treble enhancement; stereo/mono sound processing; picture-in-picture (PIP) viewing; decoding and integration of broadcast information such as closed captioned viewing, V-chip program blocking, or automatic data editing; and compression of data for storage or transmission. Each function making up the microprocessor may operate independently of other functions such that the enablement or disablement of one function does not depend on or affect the enablement or disablement of another function. In this manner, the user, through user interface 17 and microprocessor 12, may specify the exact type of processing he/she wishes the received raw data to undergo.

Once the received data has been processed according to user specification, it may be played back on the display via playback device 15 and/or stored on built-in, non-movable storage device 14. This may occur as a simultaneous recording of a number of feeds while the user plays back a selective feed in a non-real-time mode. The built-in, non-movable storage device 14 may be any storage device for audio/video information known in the art. The built-in, non-movable storage device 14 may be divided into separate Data Boxes, which may be assigned to separate members of a family, business or group. It may also be used to assign individual processing/storing instructions for processing the raw data.

Playback device 15 may include any technology known in the art for playing back audio/video data from any storage device known in the art (e.g., video tape, DVD, laser disc, etc.). In essence, the playback device 15 reads the data from built-in, non-movable storage device (or from processing means 13), and then converts it to the proper electronic signals for driving the displays (e.g., cathode ray tube and speakers, or any audio and video displays known in the art).

Virtual Transaction Zone Embodiment Single Feed Commercial Transaction Example

Either of the preceding units can be configured as another embodiment of the invention so that it can be utilized to provide direct on demand delivery of multi-formatted programs (movies, compact disc (or other audio medium), video catalogs, etc.). This embodiment effectively eliminates the need for transporting, inventorying, and physical delivery of digital data products. It can create a variety of applications from virtual VCR rental stores, music stores, bookstores, home shopping applications and other commercial applications.

Referring to FIG. 2b, data feeds 10a-10f carry electronic data from any particular source, but preferably from a computer signal, a satellite signal or a cable signal utilizing information via the Internet. The data feeds may carry audio, video, print or other mediums to the receiver 11 and, for purposes of the Internet, may utilize either "Push" or "Pull" technology as those terms are commonly referred to in the field. The data feeds may be in compressed format. Once received, the signal is transmitted to the microprocessor 3 where the information is processed according to user input.

Figure 2A:
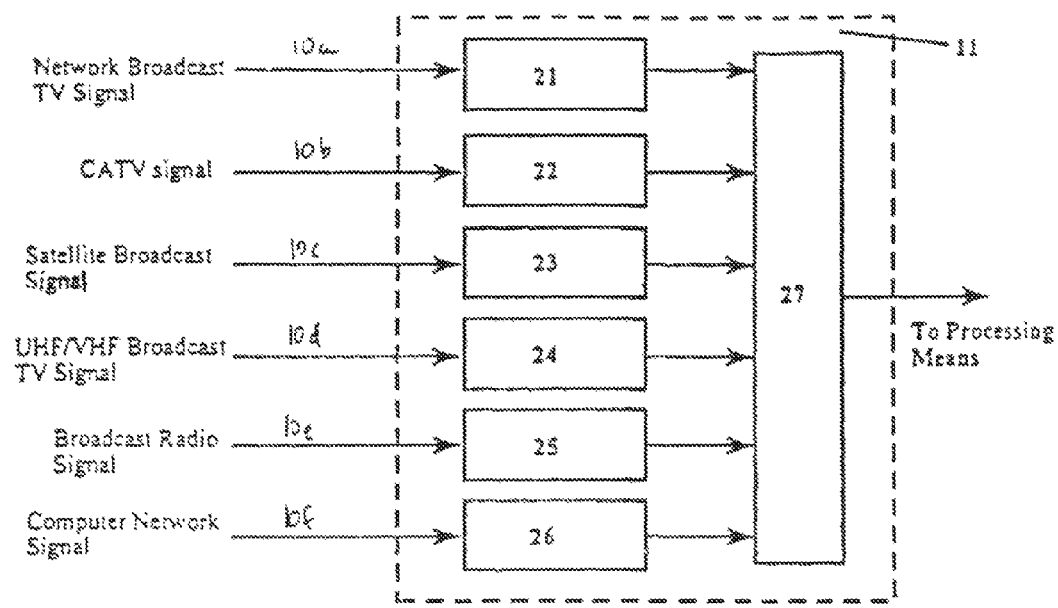

As in the previous embodiment, the receiver interfaces 21-26 in FIG. 2 are designed to accept the broadcast signals and transmit them to an output circuit 27. The output circuit 27 may be a multiplexer, sequencer, delay circuit, or other circuit generally known in the art for handling the flow of multiple output signals for individual processing. In this respect, the multi-functional processing system may process, handle, and operate on one or more input signals simultaneously. For example, one of the data feeds should be a typical Internet data feed of compressed data, which could download a movie to one of the receiver interfaces 21-26. It may also be used for a time scheduled broadcast which is auto recorded by programming user suitability into the content filter/editor. It may also contain applets or other applications to assist the processing in the transaction zone.

Referring back to FIG. 2a, from the receiver 11, the raw data received from one or more of the data feed lines 10a-10n is sent to the processing means 13. Microprocessor 12 controls the processing functions (if any) that are applied to the received data. Microprocessor 12 presents menu-driven screens to the user through the user interface 17, the display or a combination of both as are well recognized in the prior art.

As with the prior embodiment, the user interface 17 allows the user to directly control which processing functions will be applied to the received data as it is transmitted through the processing means 13. This is accomplished by transmitting a control signal 16 which the microprocessor 12 receives, interprets and uses to control the processing means 13 based on the user's specifications and would include all of the variations and features related herein above.

Figure 3A:
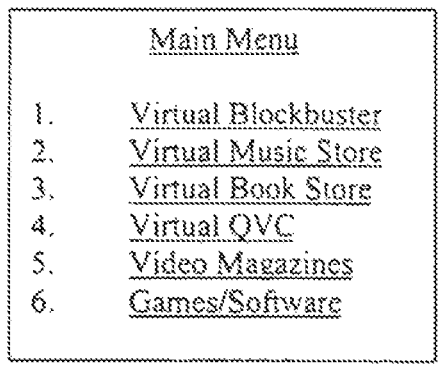
Figure 3B:
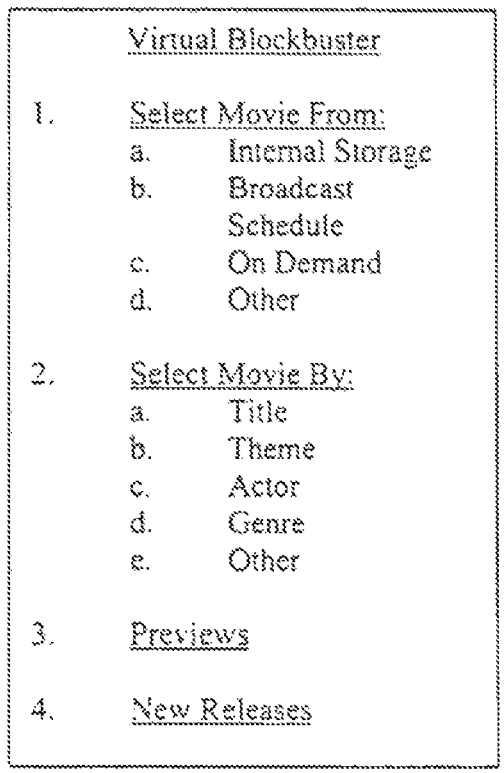

The choices provided to the user interface or the display may include retrieval of specific selections, previews, excerpts, reviews, or other information regarding the potential selections. For example, referring now to FIGS. 3a, 3b, and 3c, a user may choose to access any of several different services. This information may be resident on the microprocessor, the microprocessor, the storage device, the data feed (e.g., Java applets), or any combination. FIG. 3a is an example of a master menu for accessing different types of data fields. This menu may be viewed by the display means or through other display means viewed by the user, such as on FIG. 3b represents a choice to access movies, videos, and game cartridges for either rental or purchase, in essence a virtual video rental store. The movies are browsed, previewed, and selected using various search and retrieval algorithms (e.g., genre, title, year, actor, and director). The selections are made by user and the financial transaction is completed by payment through a screen such as seen in FIG. 3c.

FIG. 3d depicts a menu that gives the user further specificity as to what function is to be performed on the received data. By selection of one of the menu options, he/she may choose to record, play, download, upload, erase, edit, condense (or compress), or store the data in a user defined Data Box.

FIG. 3e is a menu that gives the user specificity as to recording operations that may be performed on the received data. The user may choose to Auto-Record using various criteria, including use of a content filter/editor, a DMS program guide, a clock timer, usage of VCR Plus, or TV Guide plus. The user may re-record and enact a custom edit, assign the data to a Data Box or send the data to a portable storage unit. He can select specific programming according to his User Suitability Criteria. Additionally, he can edit the data in the content filter/editor, to obtain the desired product. Additionally, he/she may instruct the system to perform Continuous Loop recording, and assign the recorded data to a main storage partition, a data box, or record by auto timer.

Figure 3F:
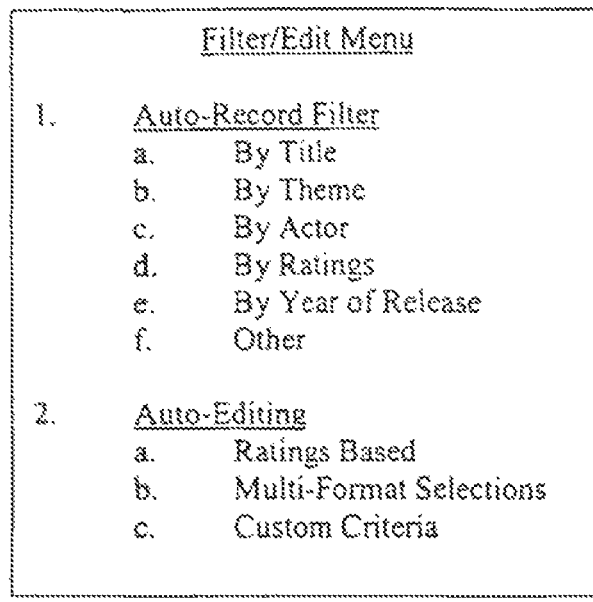
Figure 3G:
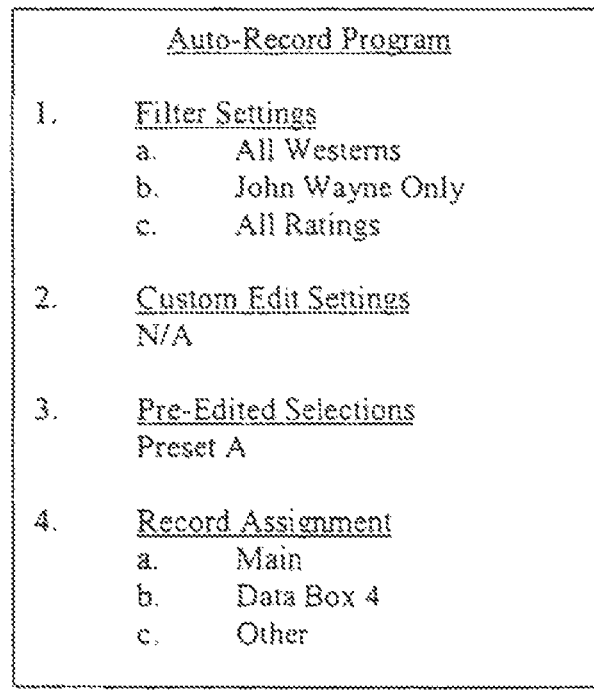

FIG. 3f is a menu that gives the user further specificity as to editing functions on the received data. The user may initiate an Auto-Record Filter, and specify that recordings be initiated based on specific features of the programming. This may include programming user Suitability Criteria, Title, Theme, Actors, Ratings, Year of Release, or any other searchable field supplied in a broadcast control data stream. He/she may also choose Auto-Editing, which may be performed by rating based programmed criteria, Multi-Format Selections, or certain specific User Suitability Criteria as may be desired by the user.

Figure 3H:
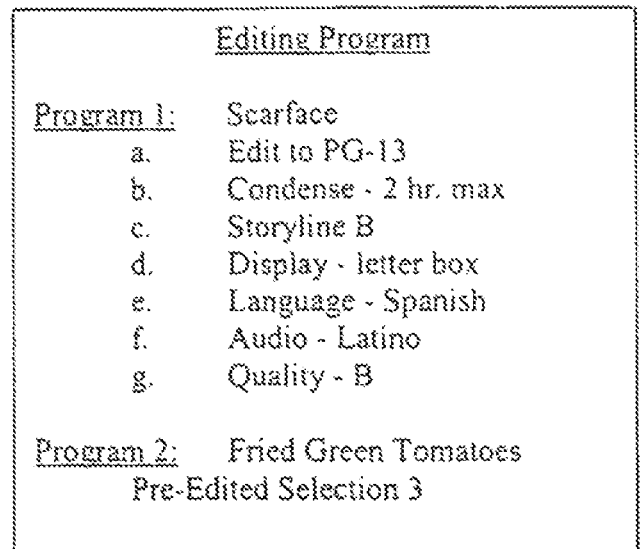

FIG. 3h is a menu that gives the user further specificity as to editing functions on the received data. When multi-formatted data is available, a first movie may be edited to select certain user suitability criteria. This criteria may be ratings based, the data may be abridged, a certain story line may be selected, the type of display, a certain language, audio parameters may be selected, and even the recording quality. A second selection may be chosen with entirely different user suitability criteria. The results may then be stored to individual Data Boxes, or displayed at the user's discretion.

Figure 3I:
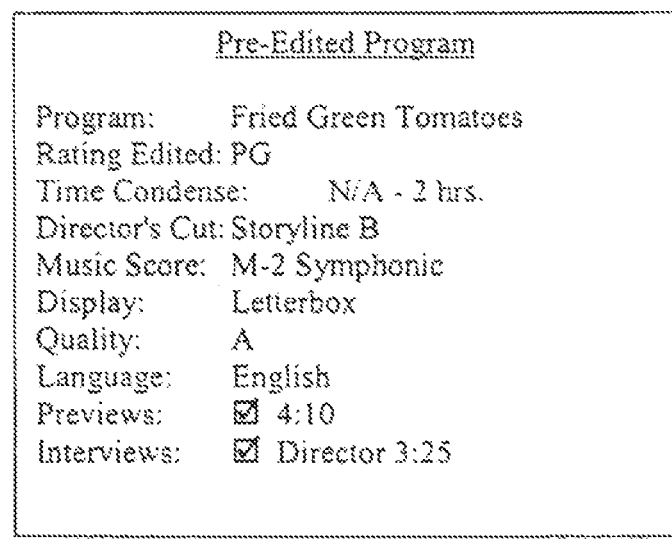

FIG. 3i is a menu that gives the user further specificity as to criteria on received data for programming that is pre-edited or multi formatted for optional editing choices. The user will immediately know if the programming that has been processed and recorded meets his suitability criteria before playback. An example is a "Director's Cut" edition of a movie, where previously unreleased scenes are included in the formatting of the data. The user may select an option to view these scenes from this menu by using embedded control data for processing, editing, display and playback, and thereby construct a custom version of the program.

As can be seen from the FIGS. 3a-3i above, a choice can be made to rent or purchase a copy of the material. In FIG. 2, it can be seen that the raw data received from data feed lines 10a-10n may be stored directly to a storage device 14 for later processing and/or playback. The payment is credited (or debited) to the selected user account with processing in the microprocessor 12 that also takes into account preset spending limits, authorization codes, and similar security and cash management features.

The processing means 13 may include any or all of the features and attributes as described hereinabove. In this manner, the user, through user interface 17 and microprocessor 12, may specify the exact type of processing he/she wishes the received raw data in the form of a movie to undergo. Using the example of the downloaded movie, the digital information would pass from the storage device 14 to the playback device. Within the microprocessor 12 (or even monitored through one or more of the data feeds), the playback or download of the movie would be noted. In the case of the purchase in FIG. 3e (denoted in the example by the "P" code), only that one download to a VCR tape would be allowed by control of the microprocessor 12. In the case of one of the rentals (denoted in the example by the "R" code), the movie could be viewed directly from the storage device 14 or be downloaded to a VCR tape or similar medium through user interface 17 utilizing, for example, a menu screen. Again, this activity is monitored by the microprocessor 12 and unless the downloaded movie is erased (and such erasure communicated back to the microprocessor 12), "late fees" could be assessed to the user until such rental was virtually "returned" to the storage device 14.

Figure 4:
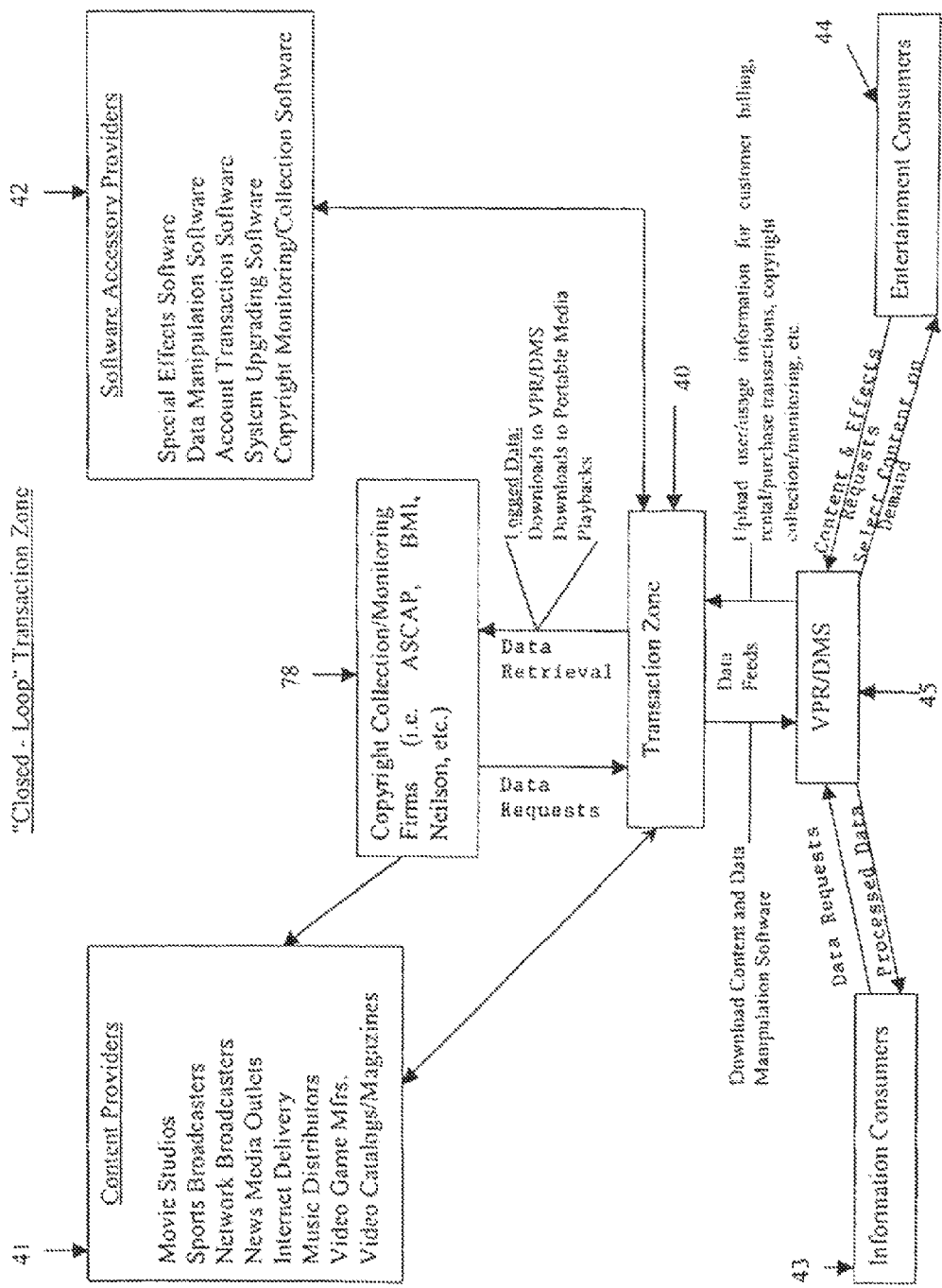
FIG. 4 shows a representation of the potential types of inputs to and outputs from the transaction zone.

Note that the microprocessor 12 control of the access to the storage device 14, creates a virtual transaction zone 40 (shown in FIG. 4). This allows the user to negotiate with the content provider for a wide range of different commercial transactions preset by the content provider but chosen by the user. The virtual transaction zone 40 provides a commercial and transactional environment that is free of restrictions of time, inventory, and, most importantly, specific formats of the physical delivery medium.

Virtual Transaction Zone Embodiment Home Shopping Example

The preceding units can be configured as another embodiment of the invention so that it can be utilized to provide direct access to shopping channels typically viewed through television channels today. Video on demand orders and (when the product is in digital format) delivery of movies, compact disc (or other audio medium), video catalogs, are all contemplated by this embodiment. This embodiment effectively eliminates the need for in store shopping or even the use of telephone lines to communicate with current television channel options. It can create a variety of applications for home shopping for clothes, hardware, building supplies, books, cars, homes, vacations and vacation rentals and other forms of purchasing that benefit from the viewer being able to access multi-media data feeds that enhance the buying process.

Additionally, the VPR/DMS unit may be programmed to automatically capture video catalogues according to certain User Suitability Criteria. In this way, the user may customize his commercial programming, for storage in his Data Box for viewing at his convenience. This is possible by utilizing the content filter/editor which interprets control data specifically for that purpose imbedded in the data feed. The catalogues may also be captured by use of the clock timer system after searching program menus for criteria matches.

Referring to FIG. 2a, data feeds 10a-10n carry electronic data from any particular source, but preferably from a computer signal, a satellite signal or a cable signal utilizing information via the Internet. The data feeds may carry audio, video, print or other mediums to the receiver 11 and, for purposes of the Internet, may utilize either "Push" or "Pull" technology as those terms are commonly referred to in the field. The data feeds may be in compressed format. Once received, the signal is transmitted to the microprocessor 12 where the information is processed according to user input. In the home shopping example, the input feed should typically be a stream of catalog information that is fed either sequentially or from predetermined search routines of the buyer's preferences.

As in the previous embodiment, the receiver interfaces 21-26 in FIG. 2 are designed to accept the broadcast signals and transmit them to output circuit 27. Output circuit 27 may be a multiplexer, sequencer, delay circuit, or other circuit generally known in the art for handling the flow of multiple output signals for individual processing. In this respect, the multi-functional processing system may process, handle, and operate on one or more input signals simultaneously. As an example, one of the data feeds would be a typical Internet data feed of compressed data, which could download a clothing catalog to one of the receiver interfaces 21-26. It may also contain applets or other applications to assist the processing in the transaction zone. For example, there may be an applet that interfaces with certain preset body measurements of the end user that are stored in the transaction zone 40 (shown in FIG. 4), thereby providing a body to simulate the fit of the clothes that are being viewed in the virtual store within the transaction zone 40.

Referring back to FIG. 2a, from the receiver 11, the raw data received from one or more of the data feed lines 10a-10n is sent to the processing means 13. Microprocessor 12 controls the processing functions (if any) that are applied to the received data. Microprocessor 12 presents menu-driven screens and visual aids to recreate the look and feel of shopping in a store and viewing the fit and style of the clothes. By way of further example, there is certain technology already known that can create a "walk around" environment to the user through the user interface 17, the display or a combination of both as are well-recognized in the prior art.

As with the prior embodiment, the user interface 17 allows the user to directly control which processing functions will be applied to the received data as it is transmitted through the processing means 13 by transmitting a control signal 16 which the microprocessor 12 receives, interprets and uses to control the processing means 13 based on the user's specifications and would include all of the variations and features related herein.

The choices provided to the user interface or the display may include retrieval of specific selections, accessing certain parts of the virtual store where goods are placed in various virtual "spaces" by specified categories (i.e., ties, blazers, shoes, socks, underwear, brand names, etc.) previews, excerpts, reviews, or other information regarding the potential selections. For example, referring to FIGS. 3a, 3b, and 3c, a user may choose to access any of several different services. This information may be resident on the microprocessor, the microprocessor, the storage device, the data feed (e.g., Java applets), or any combination.

The processing means 13 may include any or all of the features and attributes as described herein. In this manner, the user, through user interface 17 and microprocessor 12, may specify the exact type of processing he/she wishes the received raw data in the form of a movie to undergo. Using the example of the downloaded virtual store, the digital information would pass from the storage device 14 to the playback device. Within the microprocessor 12 (or even monitored through one or more of the data feeds), the download or playback of the movie would be noted. In the case of browsing a virtual store, the user would be provided, for example, a mouse driven "walk" around the virtual store.

Virtual Transaction Zone Embodiment-Multiple Feed Commercial Transaction Example Any of the disclosed units can be configured as another embodiment of the invention so that it can be utilized to provide direct on demand delivery of multi-formatted programs. Examples are movies, compact discs (or other audio medium), video catalogs, etc. This is done so that multiple feeds can be placed in the ultimate display to the user.

Referring to FIG. 2a, data feeds 10a-10n carry electronic data as in the prior examples. Once received, the signal is transmitted to the microprocessor 3 where the information is processed according to user input.

As in the previous embodiment, the receiver interfaces 21-26 in FIG. 2 are designed to accept the broadcast signals and transmit them to output circuit 27, the multi-functional processing system may process, handle, and operate on one or more input signals simultaneously. As an example, one of the data feeds would be a typical Internet data feed of compressed data from ESPN or another sports related data provider, which could download real time sports statistics and sports news to one of the receiver interfaces 21-26. It may also contain applets or other applications to assist the processing in the transaction zone. Another data feed from a broadcaster would be received from a cable input into another one of the other receiver interfaces 21-26.

Referring back to FIG. 2a, from the receiver 11, the raw data received from one or more of the data feed lines 10a-10n is sent to the processing means 13. Microprocessor 12 controls the processing functions (if any) that are applied to the received data. The channel within the data feed from the cable TV input would then be split from the cable data TV feed and combined, in the transaction zone with the ESPN data feed. Microprocessor 12 presents menu-driven screens to the user through the user interface 17, the display or a combination of both as are well recognized in the prior art.

As with the prior embodiment, the user interface 17 allows the user to directly control which processing functions will be applied to the received data as it is transmitted through the processing means 13 by transmitting a control signal 16 which the microprocessor 12 receives, interprets and uses to control the processing means 13 based on the user's specifications and would include all of the variations and features related hereinabove.

The choices provided to the user interface or the display may include retrieval of specific selections, previews, excerpts, reviews, or other information regarding the potential selections. For example, referring to FIGS. 3e, 3f, and 3g, a user may choose to access and blend any of several different services into the ultimate stored or displayed data feed. This information may be resident on the microprocessor, the microprocessor, the storage device, the data feed (e.g., Java applets), or any combination. FIG. 3e is an example of a master menu for accessing different types of data feeds and combining those fields for unique experiences. This menu may be viewed by the display means or through other display means viewed by the user, such as on the FIG. 3f represents a choice to access broadcaster channels, statistical data feeds, news data feeds, and data feeds from other users for either rental or purchase, in essence a virtual sports center in this specific example. The broadcaster channels showing sporting events are browsed, previewed, and selected using various search and retrieval algorithms (e.g., type of sport, time, professional vs., amateur, region, etc). The other types of data feeds are selected and initial positioning on the display feed are chosen (e.g., picture-in-picture, multiple screen, header, footer, etc.) The virtual store example above could have additional music added to the background for a more pleasing shopping experience. FIG. 3h is a representation of a typical screen layout. The selections are made by the user and the financial transaction is completed by payment through a screen such as seen in FIG. 3i. As can be seen from that figure, a choice can be made to rent or purchase a copy of the material.

The raw data received from data feed lines 10a-10n may be stored directly to a storage device 14 for later processing and/or playback. As with prior examples, the payment is credited (or debited) to the selected user account with processing in the microprocessor 12 that also takes into account preset spending limits, authorization codes, and similar security and cash management features.

The processing means 13 may include any or all of the features and attributes as described hereinabove. In this manner, the user, through user interface 17 and microprocessor 12, may specify the exact type of processing he/she wishes the received raw data in the form of a movie to undergo. Using the example of the multimedia array of sports programming, the digital information would pass from the storage device 14 to the playback device.

By way of example, one type of additional processing might be colorization of a black and white movie accomplished by renting first the movie and then "renting" an additional feed that provides colorization software to overlay on top of the movie in the transaction zone, where the rental for both feeds and the application of color to the feeds to create the ultimate output are implemented and payment negotiated, which is also made within the transaction zone.

Virtual Transaction Zone Embodiment—Personal Computer Example

By way of further example, the use of the transaction zone is not limited to a TV/VCR platform. It is recognized that the transaction zone could exist on a typical computer platform under any typically available operating system such as Windows, Unix or even a Macintosh environment. The transaction zone 40 would be created in the computer's RAM, the CPU would provide processing capability and the algorithms for accomplishing the transaction zone 40 (in FIG. 4) would be stored on the hard drive of the computer in the form of computer software or on a RISC chip.

Virtual Transaction Zone Embodiment—Remote Location of User Defined Transaction Zone Example By way of yet another example, it is important to realize that the current invention is not relegated to local processing and storage of data. An example of a remote unit would be a service that stores preset selection information for a series of users and access via modem through the Internet or telephone lines for remote users to link into their own or a rented transaction zone 40 (in FIG. 4) to provide the same services and advantages outlined above.

Overview of Inputs and Outputs to Closed Loop Transaction Zone

In FIG. 4, it is shown that a virtual Transaction Zone 40 relies on various types of Content Providers 41 and Software Accessory Providers 42 (collectively Providers) in order to establish one portion of a zone for accomplishing transactions involving digital data that are not format or program dependent. The Content Providers 41 may consist of movie studios, distributors, sports broadcasters, network and cable broadcasters, news media outlets, music publishers, book distributors, and generally any content providers that would otherwise utilize the television, personal computer, the Internet, or telephone lines to convey information.

Coming from the other direction, Information Consumers 43 and Entertainment Consumers 44 (collectively Consumers) provide information to a VPR/DMS 30 and upload or transfer information within the device to the Transaction Zone 40. In turn, information from the Content Providers 41 and Software Accessory Providers 42 is manipulated and downloaded based on instructions from the Consumer, which includes negotiations within the Transaction Zone 40 with the Content Providers 41-42 for download and use of the data feeds, software, and associated blended and modified data fields. The net effect of the information flow from the Content Providers 41-42 to the Transaction Zone 40 and the information flow and requests from the Consumers 43-45 to the Transaction Zone 40 creates an interactive zone for virtually selecting, packaging, renting, purchasing, pricing and payment of digital data products and the order and delivery of products and services presented to and ordered from the Transaction Zone 40.

Breadth of Technology Applications

Figure 5:
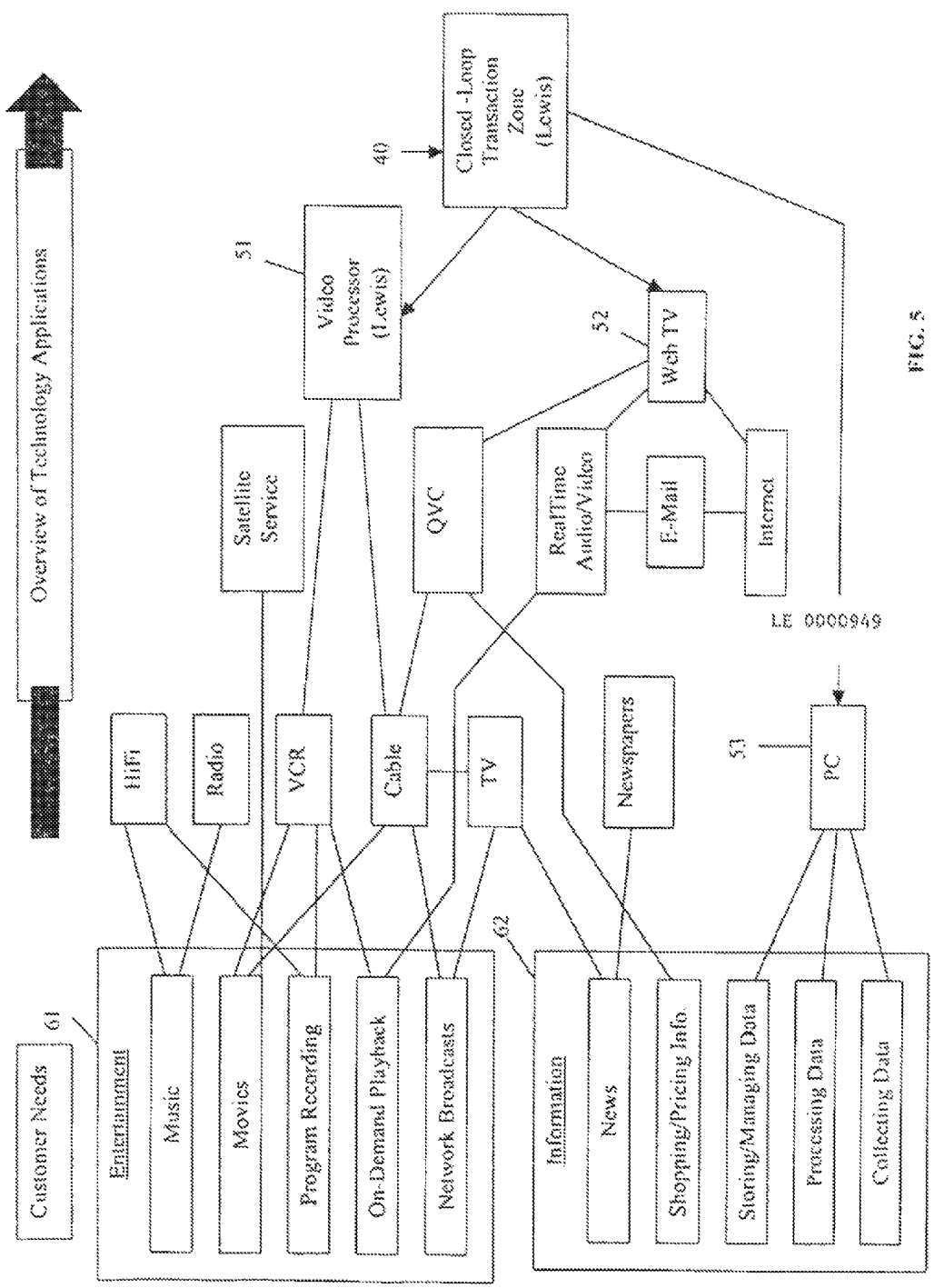
FIG. 5 is a schematic representation of a matrix of devices and sources of input and output into which the transaction zone may be placed.

In broad aspect, the current invention will most often reside in the form of software on consumer devices. It is important to note that these consumer applications fall into three devices in order to capture most forms of entertainment and information available on the market today. Referring to the matrix of FIG. 5, in the current technology environment, most of the categories of Entertainment 61 and Information 62 available on the market today percolate through to the end consumer to some type of video processor 51, WebTV 52, personal computer 53. While this is the optimum placement of the transaction zone 40 at this time, the invention is not dependent on residence on only those devices. As such, the invention is to be placed at and includes residence in the transaction zone 40 on any point or points along the matrix shown in FIG. 5.

Figure 6:
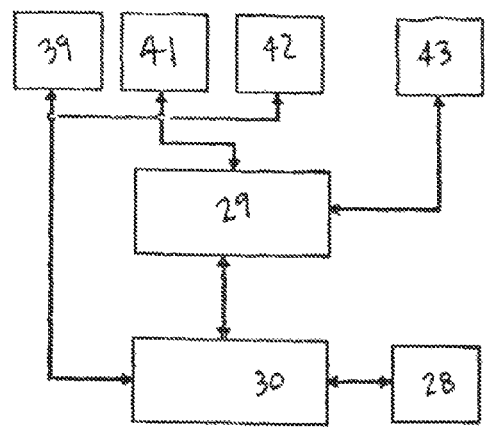
FIG. 6 shows a global diagram of the system including data content providers, remote account server, billing authorities, and the local receiver-recorder-player unit.

Referring now to FIG. 6, there is shown a block diagram of the components of the entire system as they interrelate during operation of the system.

A local VPR/DMS 30 provides the vehicle for program reception and recording, custom processing, and product download as well as program or product playback. In its most basic form, VPR/DMS 30 may be a licensed "set top box" which houses the electronic components necessary for connection and operation. The VPR/DMS 30 may be locally connected (or built in) to one or more consumer electronics units 28. This includes computers; home theater systems; home stereo receivers; CI) recorders and/or players; audio and video multi-disc players; DAT recorders and/or players; Minidisc recorders and/or players; cassette tape recorders and/or players; televisions; VCRs; DVD players and/or recorders; Divx players; cable receivers; satellite receivers; or any other consumer electronics known in the art. Additionally, the local VPR/DMS unit 30 may include a built-in portable media recorder/player such as a CD recorder/player (e.g., CD recordable ("CD-R"), CD rewriteable ("CD-RW"), CD-ROM, audio CD player, or any other CD recorder/player unit), DVD recorder/player (e.g., DVD recordable ("DVD-R"), DVD-RAM, DVD-ROM, or any other DVD format recorder/player unit), DAT recorder/player, audio cassette tape recorder/player, minidisc recorder/player, video cassette recorder/player, or any other recorder/player known in the art (which utilize a portable storage medium) so that received data may be transferred to a portable medium for use on other media playback units. The preferred embodiment may also include a DVD recorder/player also capable of reading and recording both DVD and CD formats on the same unit.

The local VPR/DMS unit 30 is directly connected to broadcasters 39, data content providers 41, software accessory providers 42 and a remote Automatic Transaction Server (ATS) 29. Data products, including free or pay-per-view television or radio broadcasts, audio and/or video products, and software products may be received directly from the broadcasters 39, data content providers 41, and software accessory providers 42 and recorded on the local VPR/DMS 30.

The remote ATS 29 provides a billing interface between the end user and the content providers 39, 41, and 42 as well as an information and auto-programming source for local VPR/DMS unit 30. This device may be located at the content provider's site, or it may be administered by the content provider/broadcaster. The local VPR/DMS unit 30 interfaces with remote ATS 29 at regular intervals to download the latest programming/scheduling information for timed television/radio broadcasts so that the end user may reliably program local VPR/DMS unit 30 to record timed broadcasts. Additionally, remote ATS 29 provides local VPR/DMS unit 30 with an electronic catalog of audio, video or software products available for direct rental or purchase. Additionally, user account information may be stored on remote ATS 29 or securely transmitted through remote ATS 29 for easy interface with billing authorities 30 and context providers 39, 41, and 42 to negotiate rentals, purchases or pay-per-view broadcasts.

Figure 7:
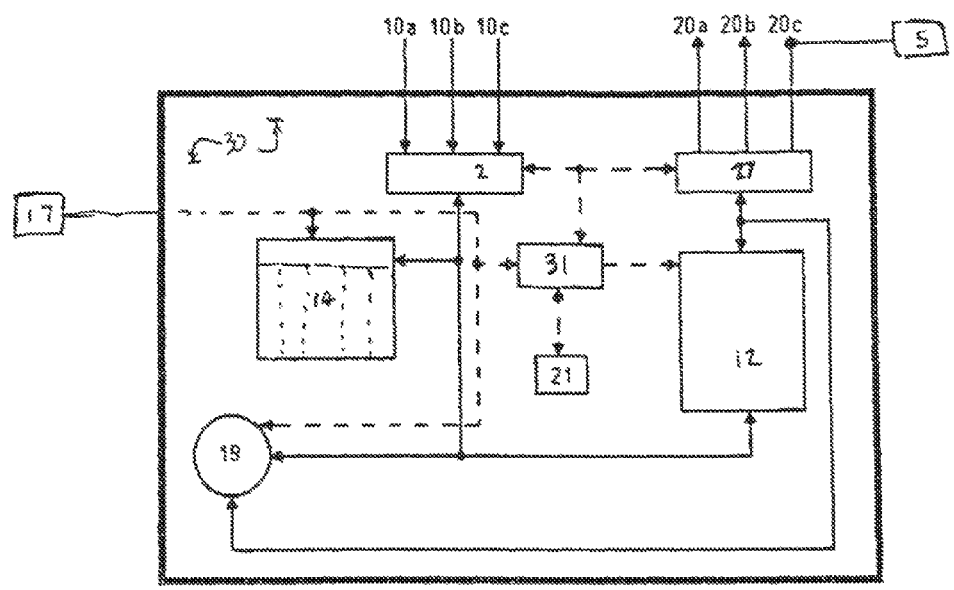
FIG. 7 shows a block diagram of a preferred embodiment of the local receiver-recorder-player unit.

Referring now to FIG. 7, a block diagram of a preferred embodiment of the local receiver-recorder-player unit is disclosed.

Data feeds 10a-10c are directly link broadcasters, content providers and the remote ATS to the local VPR/DMS unit 30. Data, including direct audio/video and software products, broadcast programs or audio/video data from local consumer electronics or computers is received and/or transmitted by local VPR/DMS unit 30 via data feeds 10a-10c Data on data feeds 10a-10c is received by receiver 2 which digitizes received analog data and which may compress both digitized analog data and native digital data. For example, receiver 2 may include circuitry that receives an analog television signal (CATV, Satellite TV, etc.) and converts it to digital data via an MPEG-2 (or similar) encoding process. The same receiver 2 may receive digital ATRAC data from a local minidisc player, however, since ATRAC data is digital, the receiver 2 would not need to digitize the data first. However, the receiver 2 may include circuitry allowing it to recognize particular digital data formats (particularly those that require large amounts of storage space) and convert or compress them to data formats requiring less storage space. For example, the receiver 2 may recognize that CD audio data is being received through a digital input. However, since CD data may take up several megabytes of storage space, the receiver 2 may first convert or compress the CD audio data into a smaller file. One method of accomplishing this task would be for the receiver 2 to convert the CD audio data into mpeg-2 layer 3 ("MP3") format using a compression algorithm developed by the Fraunhofer Gesellschaft. Similar techniques may be used for video data using the MPEG-2 format, and when they become sufficiently developed the MPEG-4 or MPEG-7 formats.

Once data has been received and compressed or digitized, the receiver 2 passes the data on to the non-movable storage device 14 for immediate or subsequent playback, processing or transfer. Storage device 14 is capable of being written to and read from virtually simultaneously to allow for immediate access to data while the local VPR/DMS 30 continues to record and/or process data. A typical medium for use as the built-in storage device 14 may include a single or multiple array of one or more high capacity random access memory devices, such as hard drives, but may also magneto-optical discs, and other re-recordable media, provided that these media allow for the near simultaneous read/write operation to enable the local VPR/DMS 30 to play back, pause, rewind, fast forward, and process recorded data as other data is being recorded.

As data is read from the storage device 14 it is transferred to the microprocessor 12 to be processed according to user input parameters. Broadcasters or information providers frequently include information encoded in broadcast signals along with the broadcast program that, when separated and decoded, may be utilized by other electronic features that may be present in the system. For example, television broadcasters include closed captioning information in line 21 of the vertical blinking interval (VBI) of a television signal. A television with built-in closed caption decoding reads this signal decodes it, and allows the television to display it. It is possible to transmit other information in this manner, including V-chip ratings, or information that may be used to automatically edit the data content. In addition to V-chip or closed captioning, the present invention makes it possible for broadcasters to transmit an uncensored or multi-formatted program, and include control information embedded in the signal. The reception and storage of editing control data may also occur prior to broadcasting the program data, or, in the case of digital music and television, as embedded control code corresponding to particular significant portions of the data. This code can be used by the microprocessor 12 to automatically edit the program according to FCC standards or based on the pre-programmed user suitability criteria and use of the content filter/editor.

The broadcasters may also transmit a multi-formatted program, and include control and program information relating to an unedited version for "re-assembly" by the content filter/editor 35 and the processing means 13. The processing means 13 of the invention embodied in FIG. 7 may include a signal processor or content filter/editor that decodes and processes any coded control information which may be included in a broadcast or other received data signal.

In addition, other processing functions, which may be accessed in microprocessor 12, include a device or circuitry for data compression, expansion, and/or encoding. These features would aid in the system in maximizing transfer rates, maximizing storage efficiency, and providing security from unauthorized access. The processing means 13 is fully programmable to allow the inclusion or exclusion of any types of available digital signal processing and/or signal decoding. The type of processing the received signal undergoes in the processing means 13 is dependent on the specific desires of the user.

After the data is processed according to specific parameters set forth by the user, processing means 13 transmits the data to the playback circuit 27. The playback circuit 27 comprises signal decoders, digital-to-analog converters and digital outputs for transmitting the processed data to a proper playback device. For example, playback circuit 27 may convert digital mpeg-2 compressed audio/video data to the proper analog audio/video signal (RCA, composite, S-video) for display on an analog source (e.g., analog television, RGB computer monitor inputs, FIREWIRE, RCA stereo inputs, S-video inputs, etc.). Additionally, or alternatively, playback circuit 27 may include output connectors 20*a-e* for transmitting processed data, in digital format (e.g., mpeg-2, Dolby Digital/AC3, DTS, MP3, etc.) directly to the digital input of an electronic component capable of decoding digital data (e.g., a digital television or HDTV, stereo receiver with Dolby Digital decoder, etc.). The invention thus contemplates the use of a combination of digital and analog outputs. For example, the user may have a stereo or component capable of receiving and/or decoding digital signals, but has not yet upgraded to a digital television. Therefore, the user connects an analog video output connector 20*a, b* to the analog video in on his TV or monitor, while connecting the digital audio output circuit 20*c* to his stereo with Dolby Digital decoder.

Automatic Digital Audio/Video Recorder Embodiment

The following embodiments are directed to specific uses for automatic recording features of the system. In its most basic form, the VPR/DMS of the present invention has many advantages over video tape recorders that record television and/or radio broadcasts. The present invention may be fully programmed to automatically record a user's requested broadcasts based on a variety of programming parameters. Referring to the drawings, FIG. 7 shows a basic form of the local VPR/DMS unit as it may be used in this embodiment.

Data feeds 1*a*-1*c* carrying electronic or broadcast data from any particular source, including but not limited to network television broadcasts, UHF/VHF signal receivers, cable television broadcasts, satellite broadcasts, radio broadcasts, audio, video or audio/video components, or computer data signals are received at the receiver unit 2. The receiver unit 2 may incorporate any one or a combination of radio or television antennas, cable television receiver, satellite signal receiver, analog RCA input/output interfaces, digital optical or co-axial I/O ports, computer network I/O ports (e.g., serial, parallel, Ethernet, token ring, FIREWIRE and others known in the art) or any other digital or analog signal receiver and/or transmitter capable of accepting a signal transmitting any kind of digital or broadcast information. Once received, the signal may be transmitted to the processing unit 3 where the information is processed according to user input.

For example, in an information subscription program, a user may be required to pay a fee in order to access information for personal use. To enforce the payment of such fees, and to prevent unauthorized access from non-subscribers, the signal may be encoded by the broadcaster, and require some sort of de-scrambler to facilitate access to the information after it is stored. In the present embodiment of the invention, the processing unit 3 may include an optional "de-scrambler," among other processing devices, which will decode the broadcast signal so that the information contained therein may be accessed for personal use by the subscriber.

Once the received signal has been processed, it may be stored in either scrambled or unscrambled format on the built-in non-movable storage device 14 for future use, or immediately accessed for present use. In a preferred embodiment, if needed for present use, the processed data is transmitted from the microprocessor 12, through the output circuit 27, to the playback device 5 which interprets the processed data and prepares it for display. For example, an audio signal is received from a compact disc player at receiver 2, and then processed and decoded by microprocessor 12 so that any audio data is separated from CD-I information on the disc. Once the data has been fully processed in the microprocessor 12, it is sent to the playback device 5 which plays back the audio data through a speaker system, and displays the CD-I information on a LED display.

In addition to allowing immediate playback of received and processed data, the present invention allows the data to be stored on an internal, non-movable storage device 14 in either processed or unprocessed format such as scrambled or unscrambled.

In that way it may be processed and/or displayed later. The non-movable storage device 14 may be any medium known in the art for storing electronic data, including, but not limited to recordable tape or other analog recording media, random access memory (RAM), CD ROM, optical disk, magneto-optical disc, computer hard drive, digital video disc (DVD), or digital audio tape (DAT). It is preferred, but not required that the non-movable storage device 14 be one that is erasable so that previously stored programs may be overwritten.

Data from the storage device 14 may be accessed for playback at the playback device 5 or for subsequent processing in the microprocessor 12. This feature is important because it allows the user to capture a data product according to his User Suitability Criteria, edit it by utilizing the content filter/editor, store it on the non-movable storage device 14, and then watch a version edited by the microprocessor 12 to his specifications. This feature allows more control over the content of programs he may view.

A preferred embodiment of the Digital Recorder Embodiment will now be described with reference to FIGS. 6 and 7.

The remote ATS 29 in FIG. 6 stores local broadcast programming data collected from the various broadcasters in an online database. The programming data is updated at regular intervals to provide the most accurate programming information possible. The local VPR/DMS unit 30 is the central component of the system, and may be used by an end user to digitally record, store, and play back broadcast programs.

Referring now to FIG. 7, a detailed description of the automatic digital recorder will now be described. Via user interface 17, the end user activates the local VPR/DMS unit to access the remote ATS server. User interface 17 may comprise a remote control unit which transmits user selection/programming option data via remote signal (e.g., infrared, VHF, etc.). Alternatively, or additionally, user interface 17 may comprise a button or set of buttons located on the VPR/DMS 30 for entering user selection/programming option data.

In the preferred embodiment, the local VPR/DMS 30 is interfaced with the remote ATS 29 via an Internet connection (TCP/IP) through a high speed interface (e.g., cable modem, a direct T1 or T3 connection through Ethernet, token ring or other high speed computer network interface). However, other interfaces may be used as well (e.g., telephone modem connection). Thus, this preferred embodiment, as part of the receiver circuit 2 and the playback circuit 27, an Ethernet input/output interface would be included to provide for the high speed exchange of data via TCP/IP (and other Internet protocols) between the VPR/DMS and the ATS.

The user connects to the ATS 29 (FIG. 6) using the VPR/DMS 30. The VPR/DMS 30 downloads the latest available programming information, presenting the user with a hierarchical set of menus (FIGS. 3a through 3i) to select specific programming parameters for setting the VPR/DMS 30 to automatically record specific programs. This selection is done either by: 1) interpreting embedded control data and matching User Suitability Criteria; 2) time schedule recording of pre-rated or pre-classified programming. In the preferred embodiment, the user interface 17 permits the user to select from broadcast program names, themes, ratings, actors, plots, times, genres (western, espionage, comedy, etc.), or any other parameter of his User Suitability Criteria, to automatically configure the VPR/DMS 30 to record specific programs. Any single parameter or a combination of a plurality of parameters may be used to narrow or broaden the range of shows that will be recorded. The user may also use a simple timer or VCR plus information as well to configure the VPR/DMS 30. The user may also select an option where the automatic recording is done perpetually until modified. He/she may also select an option allowing specific parameters to define the broadcast programs to be recorded for only a limited number of times, or for a specific period.

Once the user has finished selecting the User Suitability Criteria, the VPR/DMS, he/she may select a specific button (e.g., a START button) which activates the auto-programming feature. The micro-controller 31 queries the ATS to search for all programming meeting the parameters specified by the user. The ATS then begins searching for all of the programs that meet the user's specifications, and then sends the auto-configuration data (e.g., broadcast times, channels, and sources) to the VPR/DMS. Micro-controller 31 reads the auto-configuration data downloaded from the ATS 29. It then automatically configures the system to receive and record the requested broadcast programs. This automatic recordation is by user selection of either time schedule programming of programs pre-classified to match various user selected criteria or optionally, by interpretation of control data within the data feed.

Assume the VPR/DMS has been programmed to record a particular cable television show. At the time of the program broadcast, the micro-controller 31 activates the receiver 2 to receive the selected broadcast program. For example, the micro-controller 31 sets the receiver circuit to receive cable TV data via a data feed 10a. Specifically, the micro-controller 31 sets the receiver 2 to receive the particular channel at which corresponds to the requested broadcast program.

Broadcast program data (e.g., television audio and video signals) are received on data feed 10a at the receiver 2. In the case of recording a television program, when the analog television data is received, the receiving circuit determines that the data is analog audio/video data, and converts the television signal to compressed digital format (e.g., mpeg-2 data). Receiver circuit employs all necessary hardware and software including compression algorithms, signal processors, analog-to-digital converters, etc. for converting analog audio and/or video data to compressed digital format. Micro-controller 31 may be involved as well by receiving control signals from the receiver 2, which enable the micro-controller 31 to select the type of conversion and/or compression applied to the incoming data.

Note that the invention as disclosed herein may be used in conjunction with new emerging audio/video formats such as digital television (DTV, and HDTV), Dolby digital/AC3 encoding, Digital Theater Sound ("DTS") encoding, and mpeg-2 layer 3 ("MP3") audio formats. Although these formats are already digital, the microprocessor 12 and the receiver 2 are capable of recognizing that such formats do not need to be digitized and/or compressed, and the receiver 2 will simply receive the data without performing such operations upon it. Digital encoding and compressing capability is fully programmable by the user. User may select specific options for digital compression and encoding based on desired picture/sound quality versus storage capacity. For example, better picture and sound may require less compression to avoid loss of data. If user desires more storage capability, and is indifferent to picture quality, the system may be configured to compress data into smaller storage space, resulting in poorer picture and/or sound quality. User may select such option to optimize both parameters to his preference.

Once the broadcast program data is received and digitized/compressed, if necessary, it is recorded onto the built-in non-movable storage device 14 included in the VPR/DMS 30. Storage device 14 is capable of dynamic accessing by both a set of recording heads and at least one playback device 15 almost simultaneously to allow for instant playback of recorded data "on the fly." In a preferred embodiment, storage device 14 is a hard disk drive unit or large array of random access memory capable of storing several hours (up to 30 now) worth of compressed digital audio/video data. Storage device 14 is further capable of being accessed dynamically at different portions of the drive/array by the read and write operations nearly simultaneously. Thus, the drive may be written to and read from simultaneously, and he/she may play back, surf through a stored program, or pause live broadcasts even as the VPR/DMS 30 continues to record programs.

Upon playback, stored digital data is read from the built-in storage device 14 and transmitted to a microprocessor 12 to be processed according to User Suitability Criteria as described above. Embedded data is received with content data, and decoded by microprocessor 12 to instruct the Content Filter/Editor how such content should be edited. A representative example may include the embedding of control data relating to specific elements in a particular movie. An illustration of imbedded control data is shown in FIG. 14. A Processing circuit may decode such data on the fly, and bleep out expletives or edit pictures to remove explicit sexual content. It is contemplated that alternative scenes may be included in the data transmission, and substituted for sexually explicit scenes, on the fly if the user setting requires such content editing. It should be noted that such content editing is not restricted to "child-proofing" and ratings based applications. Such content editing may include options of adding or substituting scenes from a "director's cut" if this option is selected, or choosing between sound encoding formats (e.g., Dolby Digital/AC3 versus DTS versus Dolby Surround Sound). Such options may allow for less data to be used in that rather than providing two separate versions (actual release versus director's cut), scenes added or replaced in the director's cut may be included with control information detailing where such scenes should be placed in the movie, and as the data is played back, the processing unit can automatically add or cut scenes depending on the selected version.

Once the data has been processed according to the user's specific desires, the data is sent to the playback device 15 or to the built-in storage device 14 for subsequent playback. Playback device 15 comprises the circuitry necessary to transmit processed data to the proper playback device in the proper (digital or analog) form. For example, consider the case where user uses the device with an analog television. Since analog audio/video data is required to be transmitted to the analog audio/video inputs of a television, then playback circuit must incorporate signal decoders and digital-to-analog converters to transform the mpeg 2 data to analog audio/video signals which are then output at the device's analog outputs 20*c* (RCA audio/video outputs and/or the S-video outputs). However, the digital mpeg-2 data may also be received by the playback device 15, and transmitted in digital form directly to the digital output 20*b* with decoding or conversion to analog format. Data from the digital output 20*b* may be input directly to the television's digital input, where it is decoded by the television, rather than by the VPR/DMS 30.

It should be noted that one preferred embodiment of the VPR/DMS 30 (FIG. 7) includes a built-in recorder/player 19 for recording data to and/or playing data from a portable storage device. Examples include DVD, CD, DAT, audio or video cassette. Data stored on the built-in storage device 14 may be archived on a portable medium via portable recorder/player 19. This stored data may be in open or scrambled format depending on whether or not the data product requires a fee for accessing, renting, or purchasing. If a commercial terms between the content provider and the user are required, once transacted, an "authorization key" is issued for de-scrambling or unlocking the program, whereby the user may gain access to the data. The preferred embodiment includes a recorder/player 19 for storing data to and playing data from a digital portable medium (e.g., DVD, DAT, and minidisc, CD). Thus in the preferred embodiment, recorder/player 19 would likely comprise a DVD-RAM, DVD recordable/re-writeable (DVD-R), CD read/write CD-R/W, minidisc, or other digitally recordable drive. However, it is contemplated that the built-in portable storage device 19 may store data in analog form (e.g., videotape, audiotape, etc.).

Figure 8:
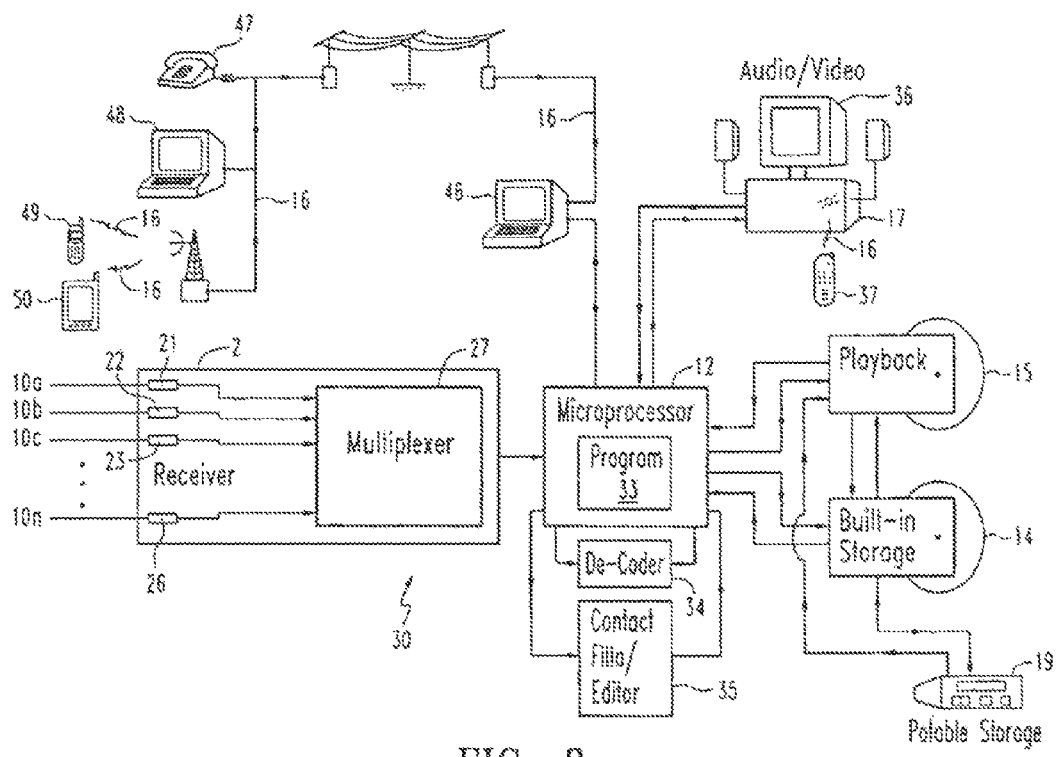
FIG. 8 is a global schematic of the present invention illustrating the flow of data, and programming instruction input pathways interrelate.

Referring to FIG. 8, a global semi-diagrammatic schematic of the present invention is shown illustrating the flow of data, and programming instruction input pathways. Data Feeds 10*a*-10*n* communicate data, through receiver interfaces 21-26 to a receiver 2. The multiple feeds are transmitted to a multiplexer 27, which simplifies the multiple signals and then transmits the data to a microprocessor 12. A software program 33 controls the operation of the microprocessor 12, which may route the data stream through a decoder 34, a content filter/editor 35, before being routed in accordance with the users program instructions. The data may be routed to the built-in, non-movable storage device 14, a playback device 15, or the user's audio/video system 36. A detailed description of manipulation of data is hereafter described in detail. Further, the data may be sent to a portable recorder/player 19 in communication with the VPR/DMS 30.

The user may program the VPR/DMS 30 of the present invention to manipulate data in a multitude of ways, and will hereafter be described in detail. The user also has great flexibility as to the ways he/she may interface with the VPR/DMS 30, and issue programming instructions. He may access the system via his/her audio/video system 36, and may program the system via cascading on-screen menus. Examples of these on screen menus are shown in FIGS. 3*a*-3*i*, FIGS. 10, 11, and 12.

FIG. 8 further illustrates that the user's audio/video system 36 may be accessed with a remote control device 37. This device generates a control signal 16 to allow the user to move through the on screen menus to enable him/her to select among the options presented. Further, VPR/DMS 30 may be programmed remotely, from a computer 46 attached to the system. Other ways in which the user can control programming of his device is by telephone 47, by a remote and/or portable computer 48, a wireless telephone 49, or a palm top computer 50 such as a PALM PILOT. In this way, the user may program his VPR/DMS 30, when he/she is away.

Referring now to FIG. 9, a schematic representation of the present invention illustrates the management of multiple feeds of data for commercial transactions. This example shows a Virtual sports Center and the management of simultaneous flows of information from Internet Data Feeds 54, Cable TV channels 55, and interaction with an on-line video catalog 56. Each of these feeds may carry multiple channels. The Internet Data Feed 54 may carry a Sports Statistics channel 57, a Sports News channel 58, and Special Effects Software 59. The Cable TV Data Feed 55 may carry a Previews and Interviews channel 60, a Live Sports Center channel 61, and a Music Overlay 62. The On-Line video catalog 56 may carry a User Account Information channel 63, and a Walk around Souvenir Store 64.

These channels communicate with the VPR/DMS 30 of the present invention, and in this embodiment, pass the information through the content filter/editor 35, then stores the information on the built-in, non-movable storage device 14 based on preprogrammed User Suitability Criteria. If instructed, the data may be stored in an individual Data Box partition of the non-movable storage device 14. The information may then be blended into a Multimedia Data Display/Playback 65, for the user's discretionary enjoyment.

On screen menus allow the selection of the source of data (FIG. 10), selection of generic types of data to be received (FIG. 11), as well as selection and rental/purchase details associated with specific selection of programming (FIG. 12).

Figure 13:
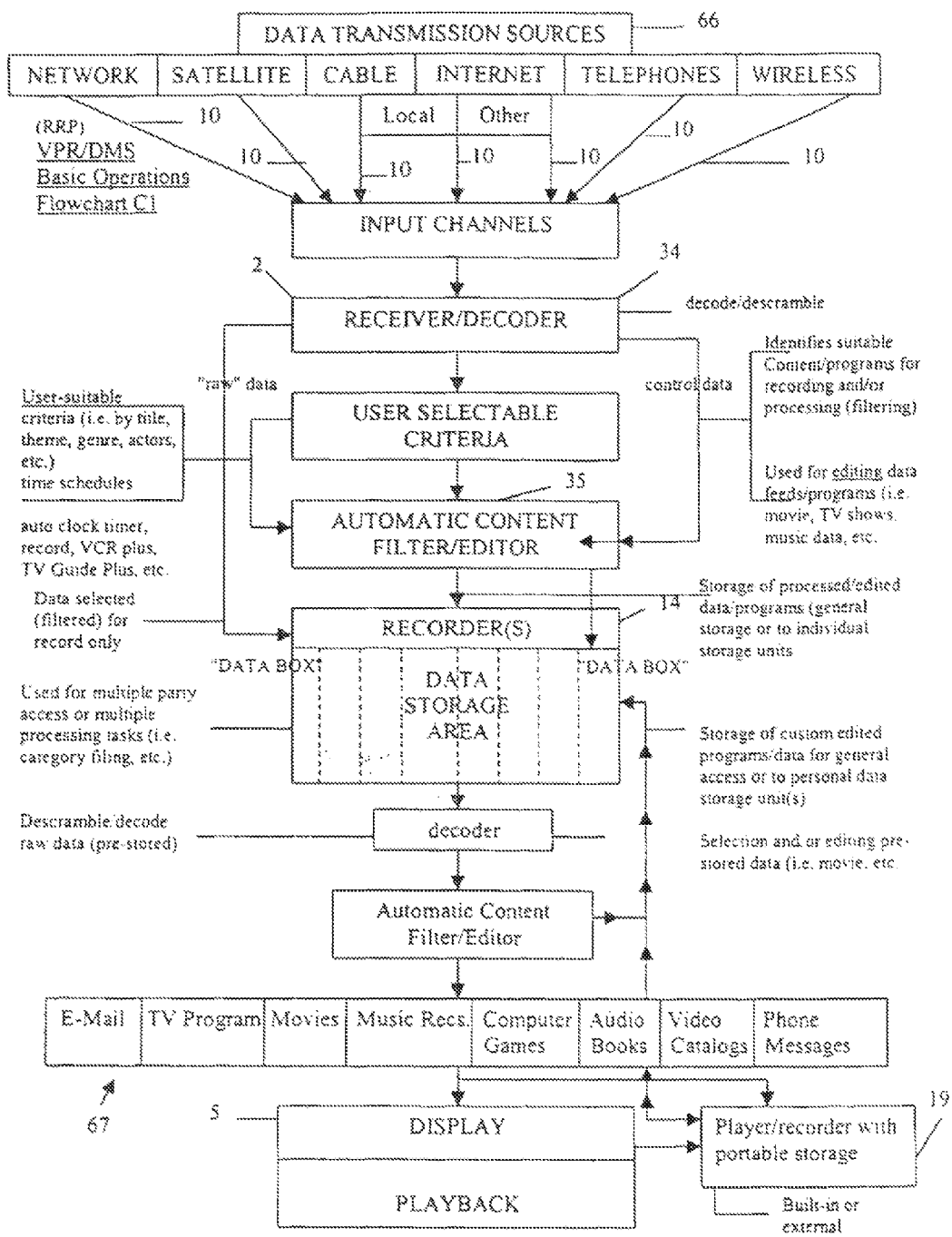
FIG. 13 is a schematic representation of the present invention illustrating the flow of data types, programming instruction, and storage options.

Referring to FIG. 13, a schematic representation of the present invention is illustrated, showing the flow of data types, programming instructions, and storage options. Data flows from Data Transmission Sources 66, which may include Network TV, Satellite transmissions, TV Cable, the Internet, Telephone, or Wireless sources. Data may also originate locally. These Data Feeds 10 flow through Receiver Interfaces 21-26 into the receiver 2. The data is processed, may be decoded or unscrambled in a decoder 34, edited according to user selectable criteria, and processed through a content filter/editor 35, and recorded on the built-in, non-movable storage device 14. Resultant Output Information 67, may take the form of e-mail, TV programs, Movies, Musical recordings or videos, computer games, audio books, video catalogues, and phone messages. All of this data may be accessed via any playback device 5 employed by the user. Information may also be communicated to a portable recorder/player 19.

Multi-Formatted Broadcast Processing

Referring now to FIG. 14, a schematic representation of the present invention is illustrated, showing how multiple control data channels may be used to control, filter and edit content to be played back. This diagram generally illustrates Multi-Formatted Data, and shows how it may be processed by the VPR/DMS 30 of the present invention. The Data received may comprise a large number of Control Data (CD) tracks 69. This is represented by a block diagram of a Multi-Formatted Data Transmission 68. Each control data track 69 comprises unique and distinguishable data, that may include multiple language tracks, multiple audio tracks, and multiple story lines. Further, audio/video segments may have specific scenes, dialog, narration, previews, and adult content. Control Data tracks 69 may also have indices for identification of user suitability criteria, interactive control data, and subscription/fee based transaction information. The existence of this information allows the user incredible flexibility for customizing the digital data product in accordance with his/her preferences, by use of the content filter/editor. Control data may be provided on parallel tracks or channels, providing general processing/editing controls. Control data tracks 69 may also be included within the main program data for use by the VPR/DMS 30 for identifying specific data or data segments for manipulation, editing, and re-assembly by the content filter/editor.

Broadcasters/content providers may now transmit highly formatted programs that include TV shows, movies, audio/video product catalogs, and music channels. When received and processed by the VPR/DMS 30 allows users to record and/or display the broadcast in various optional edited (or processed) versions based on pre-programmed user suitability criteria. These broadcasts may include data having several optional story lines, optional advertising formats, and optional program preview formats. It may also include data representing several optional story endings, optional display formats, and data representing edited versions of the program based on a content rating system.

Along with the broadcast signal is control data that may be interpreted and utilized by the VPR/DMS 30 and specifically processed by the content filter/editor. The utilization may include control data for processing, recording, and/or displaying the broadcast in customized edited versions. These variations are generated according to the preprogrammed user suitability criteria, which has been pre-programmed in the system. The User Suitability Criteria directs the content filter/editor to interpret and utilize received control data for editing, thereby creating a program tailored to the user's individual tastes. This may occur either before or after storage of the data in the non-movable storage device 14.

Referring again to FIG. 14, the VPR/DMS 30 demonstrates its improved features over DVD players that processes and plays back multi-formatted program data in various optional display/playback versions. The improvement over these prior art devices occurs where the VPR/DMS 30 operates with live broadcast signals which are not limited by the formatting capability of DVD or any portable storage media with highly restrictive data storage capacity.

Users and broadcaster/content providers may also take advantage of other VPR/DMS features for providing a multitude of user options and unique functions. For example, a highly formatted broadcast program (movie, etc.) may first be recorded in raw form onto the System's built-in storage device. Subsequently, individuals, family members, business associates, and public access applications may retrieve or order a customized edition of the program which has been processed by the system according to the individual's User Suitability Criteria for display, playback, and/or recording. Recording of the customized program may be done in the Data Box partitions of the built-in storage device, or onto a portable recorder. This customized editing feature allows each member of a family to enjoy a customized edition of the broadcast program/movie according to their own personal preferences, or those of the VPR/DMS system administrator. This functionality gives parents greater control over content to be viewed by their children. It also provides many new opportunities for broadcasters and content providers to transmit various editions of custom programs and custom targeted advertising data all contained within a single broadcast transmission.

As FIG. 14 illustrates, in a fee based or subscription broadcast model, this system provides great flexibility and customization of programming data according to various user suitability criteria that may increase the frequency of program viewing. This translates to increased revenues from delivery of preferred data products which may be accessed by pay-per-view, rented, and/or purchased directly through the VPR/DMS 30 system. An additional benefit of the VPR/DMS 30 system includes data delivery used in a public access system. Like other functions of the system, these operations may be programmed by the end user.

Product Advertising Operations

Figure 15:
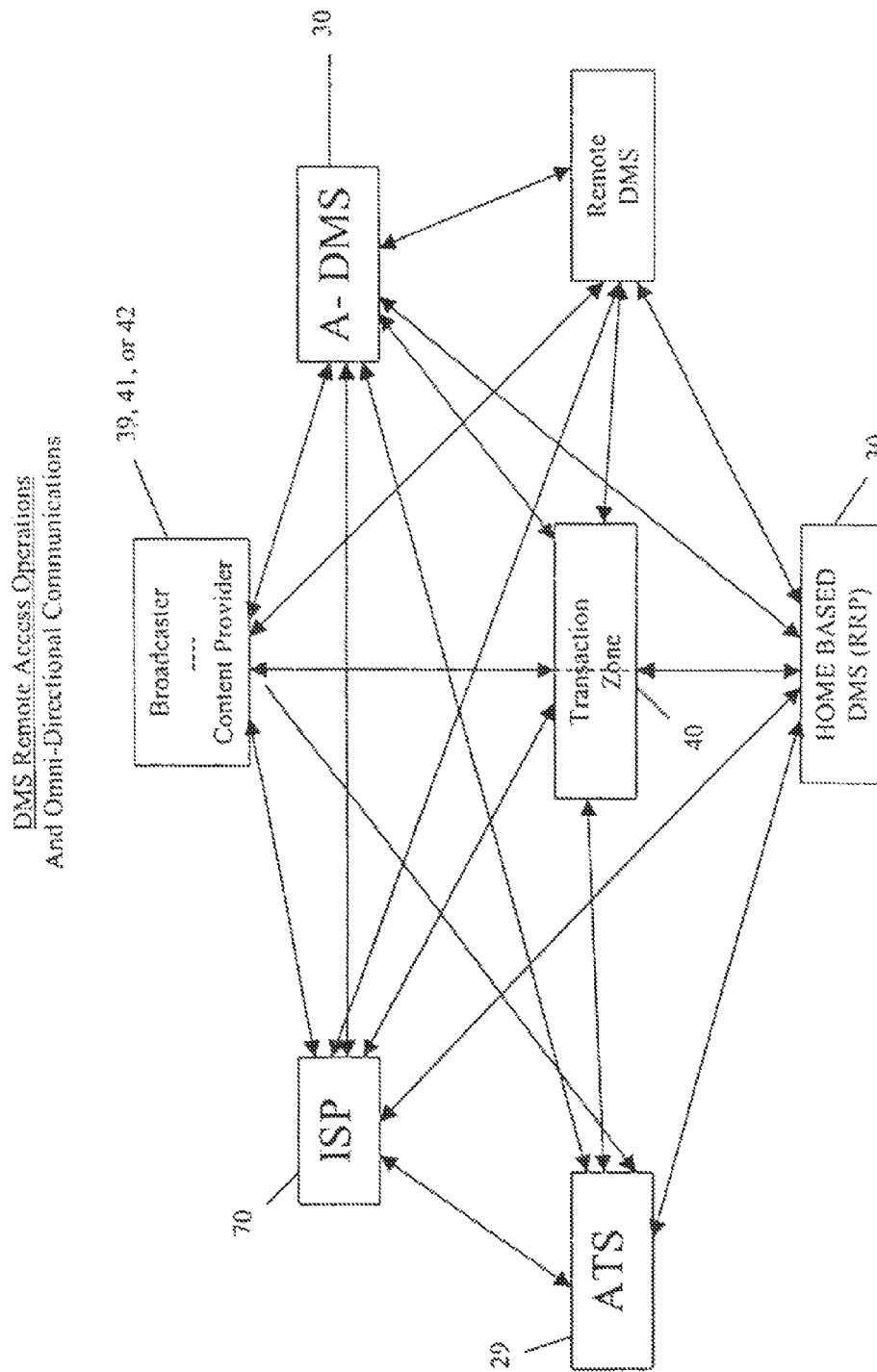
FIG. 15 is a schematic representation of the present invention illustrating the communication pathways between system components, content providers, and a transaction zone.
Figure 16:
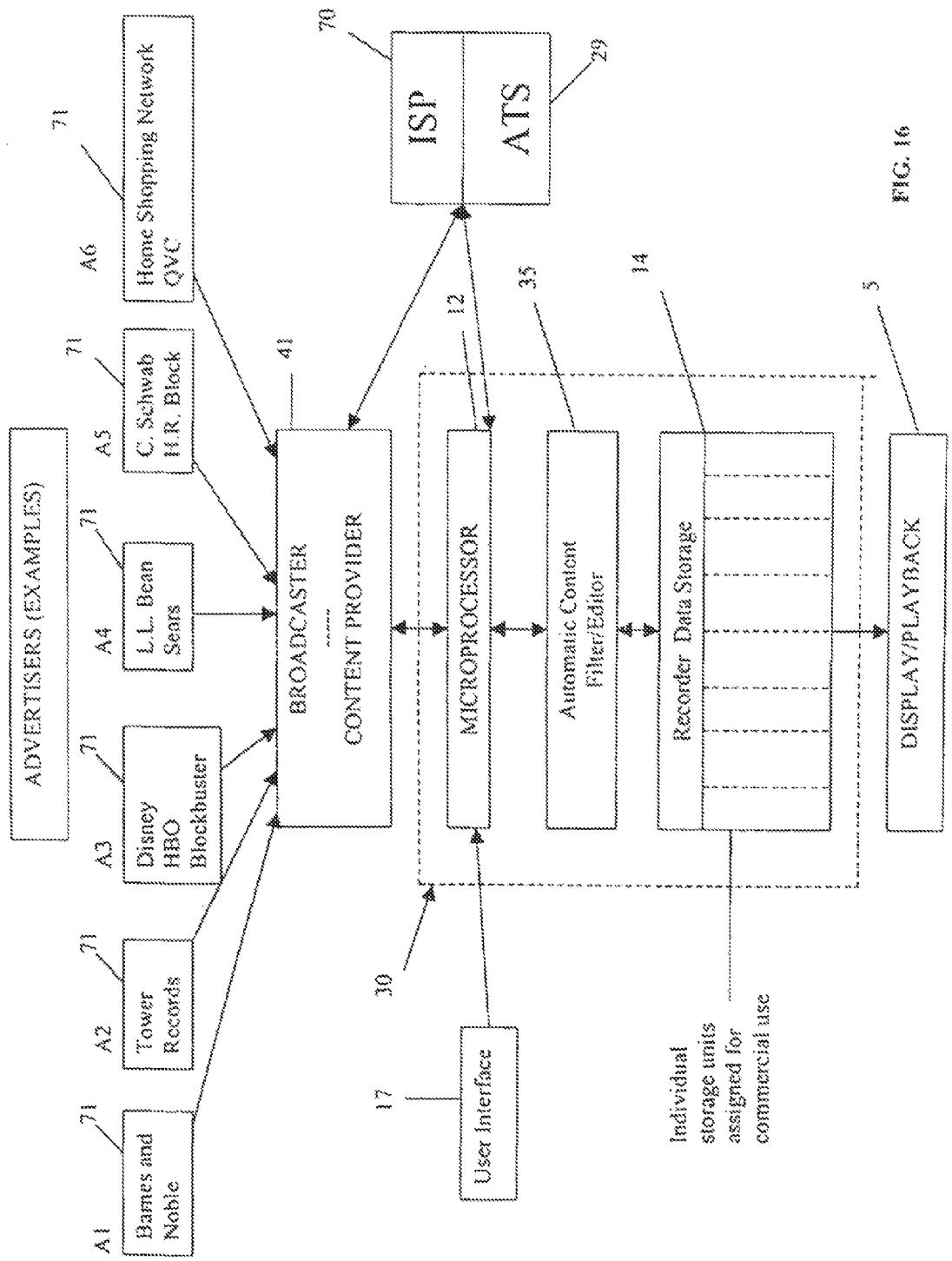

Referring to FIG. 15, a schematic representation of the present invention illustrates the communication pathways between system components, content providers, and a transaction zone 40. A broadcaster 39, content provider 41, or software accessory Provider 42, communicate with an Internet Service Provider 70, a Transaction Zone 40, and the VPR/DMS 30 of the present invention. This connectivity allows for the expeditious transfer of data as is further described by these preferred embodiments.

Figure 16:
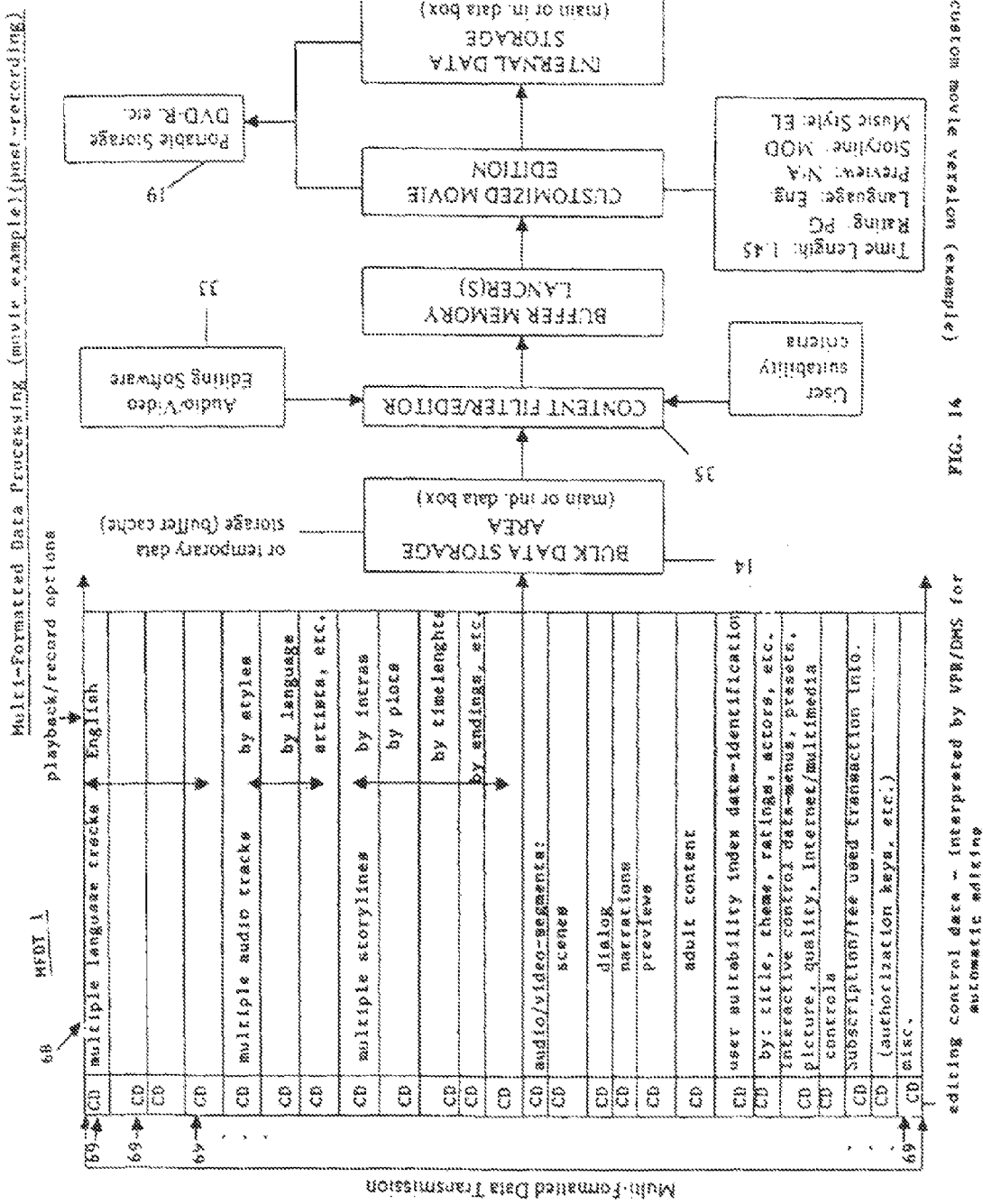
FIG. 16 is a schematic representation of the present invention illustrating the communication pathways between advertisers, a broadcaster/content provider, system components/programming, and the non-movable storage device.

Referring to FIG. 16, a schematic representing the present invention illustrates the communication pathways between advertisers 71, a broadcaster content provider 41, and VPR/DMS components/programming. The VPR/DMS 30 system creates a new, unique, and ideally suited vehicle capable of managing the delivery of product advertising at the speed and efficiency available with existing electronic commerce systems, including the Internet.

Figure 17:
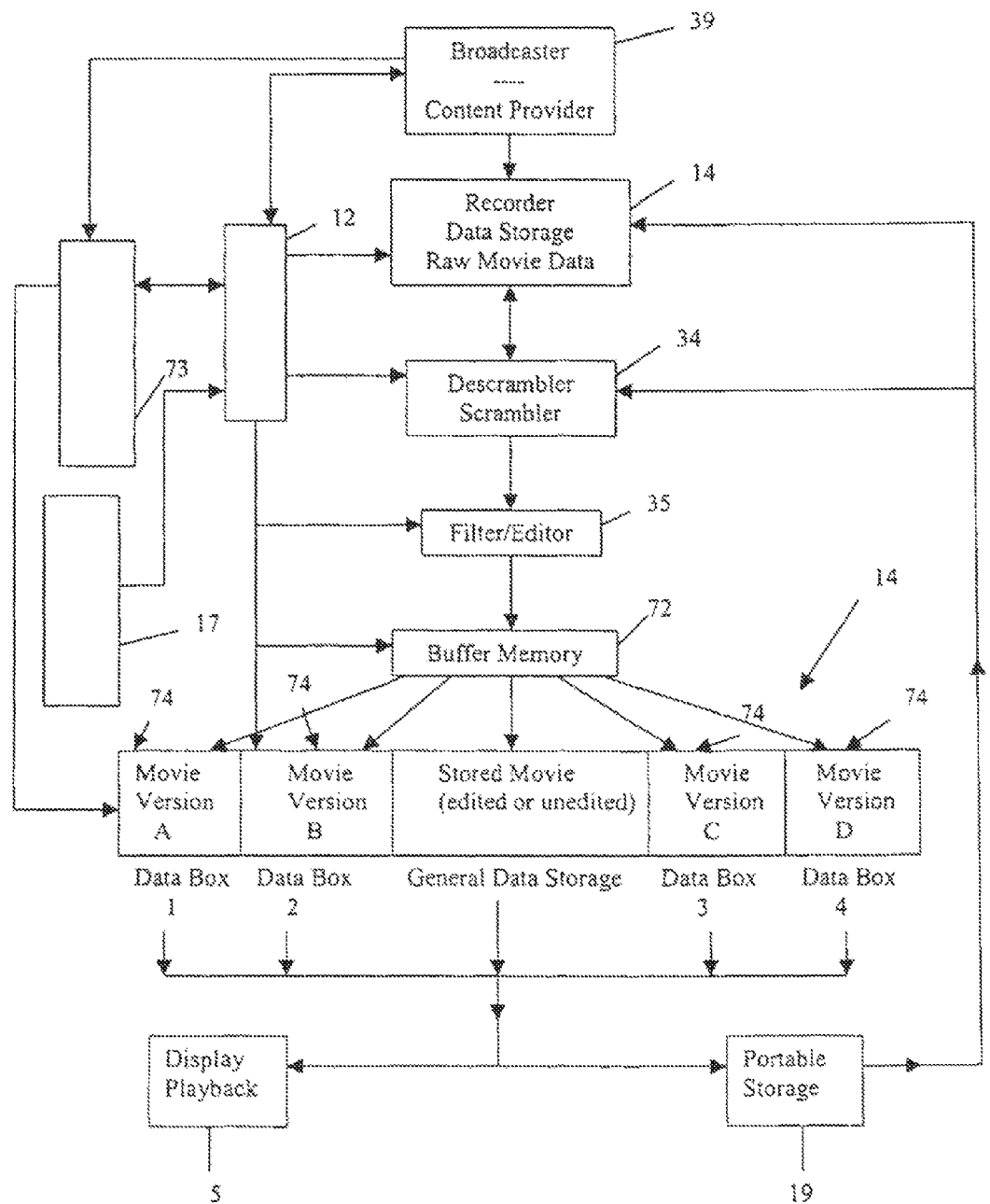
FIG. 17 is a schematic representation of the present invention illustrating post recording data processing.

Referring now to FIG. 17, a schematic representation of the present invention further illustrating post recording data processing is shown and described. Advertising data transmitted from a broadcaster 39 or other content provider, is received in the VPR/DMS 30 and is recorded on the built-in, non-movable storage device in it its raw form. The VPR/DMS is then able to interpret the data in the decoder 34, and process and edit the data according his/her preprogrammed User Suitability Criteria. The data is sent through the Content Filter/Editor 35, where it is edited, and held in buffer memory 72 until instructions are received as to the user's desires, which may include a storage, display or playback preference. Multiple versions of the data may be transferred to storage in individual Data Boxes 74 of the built-in, non-movable storage device 14. The data may then be sent to a Playback Device 5, or transferred to a Portable Recorder/Player 19 or other such portable storage device.

In addition to delivery transactions involving digital data products (i.e. movies, premium, TV shows, video games and physical product catalogs), the VPR/DMS 30 system also provides multi-layered advertising formats with numerous advantages to both advertisers and consumers. Some of the various advertising formats included in the VPR/DMS 30 of the present invention are:

1) Combining advertisements with on-screen menu selection displays. Examples include: "live" feeds, VPR/DMS 30 recorded data, software based programs, and Internet overlays 2) Combined with product preview data, audio/video recordings, product catalogs, data feeds, VPR/DMS 30 recorded data, Internet data, as well as broadcast movies, and videos.

3) Combined with rented or purchased digital data product delivery ("live", recorded, Internet, etc.)

4) Delivered by TV/radio network broadcast channels assigned for use with VPR/DMS 30 system 5) Delivered by computer/Internet Web sites associated and/or interactive with VPR/DMS 30 system 6) Delivered by use of excess data capacity existing within all various digital data signal feeds (such as now used for closed captioning, TV guide schedules, VCR+ time clock programming, etc. and same for similar data feeds specific to use with VPR/DMS 30 system)

7) Programmable designation of advertising "sections" within VPR/DMS 30 internal storage areas. These permanent or programmable "sections", "data boxes" or "spaces" are monitored and controlled by both content providers (or VPR/DMS 30 central data base) as well as by end users according to pre-set or negotiable criteria. The designated advertising "sections" might be used for delivering advertising feeds, which are processed and recorded by VPR/DMS 30 system for real-time or subsequent viewing by end user. These advertising data feeds might be mass distributed or broadcast to VPR/DMS 30 customers, or might be selectively distributed according to customer profiles, demographics, or other criteria. Profile criteria can be established through analysis of customer activity history from on-line monitoring. Alternatively, it may be developed from customer information inquiries acquired directly through system interaction or from outside customer profile data sources. Advertising "sections" or "spaces" or "data boxes" may be reserved, rented, leased or purchased from end user, content providers, broadcasters, cable/satellite distributor, or other data communications companies administering the data products and services. For example, a wide band, multi-media cable distributor may provide, lease or sell a cable "set top box" containing the VPR/DMS system. This VPR/DMS 30 comprises a built-in non-movable storage device 14 which has certain areas that are reserved and controlled by the cable company. These areas are available for commercial sales or leasing to others, who may include movie distributors, advertisers, data product suppliers, video game suppliers, video magazine publishers, or video product catalogue companies.

As shown in FIG. 16, advertisements which are delivered to the VPR/DMS 30 advertising "sections" can be customer specific by use of systems built-in signal decoding and the data content filter/editing algorithm. This is accomplished either by customer selection or by activity history monitoring. Selective recording of customer specific advertisements can be automatically processed and recorded onto the designated advertising "sections" of the VPR/DMS 30 system's internal storage areas. It may also be delivered through or onto other available advertising storage areas or monitoring channels of VPR/DMS 30 system. This offers a great advantage to both the advertiser and the VPR/DMS 30 customer for maximizing content, establishing customer qualifications, and ultimately producing more cost efficient advertising for product and service providers.

8) Another important capability of the VPR/DMS 30 system allows for an entirely new method of processing, delivering, and managing advertising programs. Because the VPR/DMS 30 system is an on-line, integrated, and interactive system it represents the next generation of high speed automated advertising, perfectly suited for modem electronic commerce applications. Controlled through a VPR/DMS 30 central database (or other associated control database), prospective advertisers will be continuously updated by on-line data transmission into advertisers computer systems, and specific to a variety of customer profile data. This data is continuously retrieved, stored, and processed by VPR/DMS 30 central database through monitoring and service interactions with VPR/DMS 30 customers. This data specific to advertiser analysis will include for examples, total number of customers (system users and/or specific product subscribers), customer profile data, customer demographics, program schedules, product showcase schedules, available advertising formats, available advertising schedules, advertising rates, etc. Various advertising analyses can be made automatically for a selection of advertising formats, according to critical factors such as timing and cost effectiveness. Pre-programmed or spontaneously programmed advertising format scenarios can be instantly analyzed and displayed or produced on advertiser's system by use with custom VPR/DMS 30 analysis software located at VPR/DMS 30 central data base or present with advertiser's systems. Once all format decisions are made by the advertiser, it may then place the desired advertising order for "instant" or scheduled delivery to VPR/DMS 30 customers. For example, one available advertising placement option might indicate a selective customer base of 5,000,000 VPR/DMS 30 subscribers who have available space on advertising "sections". Providing the advertiser has immediately available advertisement formats (audio/video/text, etc.) for transmission, then instantaneous advertisement delivery can be transmitted to the 5,000,000 qualified customers. This may be sent via a VPR/DMS central data base and control center which may be located at the Content Provider's site 41 or on the remote ATS 29 (FIG. 15). The same or similar advertisement distribution can be accomplished expeditiously as soon as materials are available. Another example would allow an advertiser to make qualified yet almost instantaneous transactions for placement of advertising within a scheduled "issue" of a video magazine. It would be electronically delivered to VPR/DMS 30 subscribers and recorded onto designated storage areas of end user's VPR/DMS 30 system. The entire transaction can be instantly and automatically conducted within the "Transaction Zone" of the VPR/DMS 30 system.

9) To increase effectiveness and profitability of advertising within this system, many means are available including placing advertisements in and around desirable broadcast feeds which are specifically tailored to the consumer's specific User Suitability Criteria and content filter/editor, enabling the user to see only advertising of interest, thereby making the advertising more effective. Ad distributions would include those for movies, TV shows, sports programs, and previews. Targeted advertisements within specialty product catalogs, and supplying to specialty product/user specific product catalogs may also be distributed to consumers. These examples may be delivered in the form of audio, video, audio/video, still graphics, text, or other data formats.

In addition to the systems' capabilities for downloading audio/video data to portable storage devices, the system might also include outputs to printers for producing printed copies of text, graphics, or captured still images. This would occur if such output systems are connected to VPR/DMS 30 system.

Referring now to FIG. 17, a schematic representation of the present invention further illustrating post recording data processing is shown and described. Data transmitted from a broadcaster 39 or other content provider, is received in the VPR/DMS 30 and is recorded on the built-in, non-movable storage device in it its raw form. Upon completion of a commercial transaction, (i.e. rental, purchase, or pay per view) an authorization key code 73 is supplied to the user. He/she is then able to de-scramble or otherwise unlock the data in the decoder 34, and process and edit the data according his/her preprogrammed User Suitability Criteria. The data is sent through the Content Filter/Editor 35, where it is edited, and held in buffer memory 72 until instructions are received as to the user's desires, which may include a storage, display or playback preference. Multiple versions of the data may be transferred to storage in individual Data Boxes 74 of the built-in, non-movable storage device 14. The data may then be sent to a Playback Device 5, or transferred to a Portable Recorder/Player 19 or other such portable storage device.

Automobile System

The incorporation of the VPR/DMS 30 device into or connected with automobile receiver and playback devices (which may include satellite, radio, wireless communications) is one preferred embodiment of the present invention. This embodiment allows all functionality unique to the present inventions in an automobile, and also enables all VPR/DMS rental/purchase transaction capabilities for direct delivery of digital data products. It also allows transactions involving rental/purchase of other products and services not normally delivered as digital data. For example, ordering a music CD after reviewing song excerpts received and processed by VPR/DMS system.

The portable, built-in auto mounted VPR/DMS system also provides a valuable tool for automatically or manually processing and recording the ever growing varieties of audio/video/computer data presently received by automobile receiver/playback/display systems during a period of time when the user is likely to buy the product—while he is driving.

Portable VPR/DMS and Public Access

The portable, auto mounted VPR/DMS system is particularly useful for integration with public access data communication systems to provide the user most or all of the benefits enabled by these inventions, although portability need not be confined to automobiles. A portable system may be embodied as visually similar to a laptop computer, but retains all the functional capability of the home based system. Further, access to any VPR/DMS via a telephone, a remote computer having a modem, or a palm top computer, such as a PALM PILOT is possible with the present invention.

For example, with little or no modifications to public use telephone systems and computer/Internet communication systems, the portable VPR/DMS can be connected to or built into these systems whereby virtually all rental/purchase transactions may be quickly and effectively conducted. Upon interconnection between these systems, the user selects a variety of digital data products for preview, sale or rental from on-screen menus, or auto-recorded via programmable User Suitability Criteria and content filter/editor.

These data products might be transmitted through integration with public access system from various digital data sources such as cable TV, satellite, phone lines, computer/Internet, or any other data broadcast source. After completing the commercial arrangement within the Transaction Zone, the broadcaster/content provider transmits data product through a novel electronic data dispenser system (EDDS). This EDDS may incorporate a fully functional VPR/DMS, or provide a convenient connection for the VPR/DMS portable device that stores the data product onto designated storage area within system. Alternatively, the data product may be directly transferred from the EDDS to a portable storage device. Upon receipt of the data, the user may enjoy access to the data product, (for example a new audio CD recording). Access would occur for a limited period if rented, after which, the data product must be "virtually returned" by re-engaging the portable VPR/DMS, or portable storage device with the EDDS for erasing, encrypting or scrambling the data product. If the data was purchased, he/she may be able to utilize the data product as often as desired. All other functions and processes necessary for these transactions are virtually identical to those described previously in home or office based rental/purchase transactions.

The EDDS system is enabled to dispense or display on a built-in TV screen/monitor only those data products, which are stored on-site and within storage areas of the EDDS system. The EDDS may be updated via physical delivery of data products, or it may also be updated through online data communications with a central database control system.

Virtual Digital Data Rental/Purchase Embodiment

Either of the preceding units can be configured as another embodiment of the invention so that it can be utilized to provide direct on demand delivery of multi-formatted programs (movies, compact disc (or other audio medium), video catalogs, software, video games, etc.). This embodiment effectively eliminates the need for transporting, inventorying, and physical delivery of digital data products. It can create a variety of applications from virtual VCR rental stores, music stores, bookstores, home shopping applications and other commercial applications.

Referring to FIG. 6, data feeds carry electronic data from the audio/video content providers 41, and software accessory providers 42. Data travels between the remote ATS 29 and the local VPR/DMS 30). This includes computer software, video games like NINTENDO 64 or SONY PLAYSTATION. Data is preferably transmitted via: a high speed computer signal (T1 or T3 connection via Ethernet, token ring; cable modem; high speed analog or ISDN modem or other high speed computer network connection); satellite signal; or cable signal utilizing information via the Internet. The data feeds 6 may carry digital audio, video, print or other mediums directly to the local VPR/DMS 30.

Under the virtual rental/purchase store, the user has several options. He may choose from products listed in an electronic catalog which is either downloaded from the remote ATS, or received via direct broadcast feed. He may set the content filter/editor to automatically record data according to User Suitability Criteria or specifically selected programming. In either case, the data from which is stored on the local VPR/DMS. The VPR/DMS unit interfaces with the ATS to establish two-way communication with a broadcaster/content provider and update itself at regular intervals, providing the home user with the latest available rental/purchase information. For example, the user may browse through available software titles to select a particular product she would like to purchase or rent. The local VPR/DMS obtains the necessary information from the user to identify the selected product; retrieves stored or spontaneously entered billing information, and then transmits the information to the remote ATS. The remote ATS receives the requested information, and validates the user's account and billing information. It then electronically negotiates the purchase or rental, either before or after storage in the VPR/DMS, from the content provider, and configures the local VPR/DMS to connect to and receive the requested data from the content provider either on-demand or via a broadcast schedule.

In one type of purchase transaction, the data is received and stored on the built-in storage device where it may be accessed for processing, playback or transfer to other media. The data may be received in a scrambled or encrypted format, and may have either content or access restrictions, but also may be provided without restriction. For example, in a rental or purchase transaction, the remote ATS, the local VPR/DMS, (or both) retain rental control information, which is monitored by the broadcaster/content provider, to restrict the use of downloaded data past the or prior to negotiated rental period or purchase transaction. For example, control data indicating rental restrictions for a particular title may be stored by the VPR/DMS upon receipt of the digital data product from the content provider. Once receipt of the data is acknowledged by the VPR/DMS and the transaction is completed, the user may play back the data product, store it, or transfer it to portable medium for use on a stand alone playback unit (e.g., DVD Player, VCR, etc.) provided all necessary transactions are completed. If the data product is stored in scrambled form, an authorization "key code" must be received from broadcaster/content provider to unlock the rented or purchased program by use of a built-in data descrambler device.

In order to avoid late charges or fees for rental transactions, the user must "return" the data product by selecting a return option from the electronic menu. Additionally, the system is programmable to automatically return, erase, scramble or block out the data/program when the rental, preview, demo time has expired. The VPR/DMS interfaces with the ATS to negotiate the "return", and the data product is erased from the VPR/DMS storage device or re-scrambled (authorization key voided, where the data product remains stored for future access/rental/purchase). The data product has been transferred to portable medium; the control data keeps a record of such transfer, and requires the portable medium to be erased before successfully negotiating the "return." In this way, the system is programmable by the end user and broadcaster/content provider to enact a "virtual return" of data products stored on the non-moveable storage device.

Virtual Movie Rental Embodiment

Referring now to FIGS. 6 and 7, the user activates user interface 17 to connect the local VPR/DMS 30 (from FIG. 6) to the remote ATS 29 to enable renting a movie. VPR/DMS 30 queries the remote ATS 29 to provide listings of available tides for rental. Remote ATS 29 maintains a periodically updated database of available movie titles available for purchase or rent, and transmits such information to the local VPR/DMS 30 for display. The user makes rental selections from among the available titles via the user interface 17. An example of an on screen menu is shown in FIG. 3c. Once the user has finished making selections, the local VPR/DMS 30 transmits the user's selections to the remote ATS 29 which proceeds to negotiate the rental transactions from the movie content providers.

ATS 29 queries the user for billing information. Alternatively, the user may maintain billing information in the system (either locally, or in a database stored at the ATS 29 location). ATS 29 verifies the billing information with the proper bank, credit card company, or other financial institution, and then negotiates the transfer of requested movies from the content provider to the local VPR/DMS 30. This is accomplished by establishing an interface (preferably a TCP/IP connection) between the VPR/DMS 30 and the data content provider 41. The ATS 29 also provides billing information to the proper financial institution, authorizing charges against the user's account.

Once the direct connection between the data content provider and the VPR/DMS 30 has been negotiated, VPR/DMS 30 begins downloading the requested movies. The ATS 29 provides rental information control data that includes rental periods, due dates, applicable late fees, and content enabling data associated with each data product downloaded. An illustration of imbedded control data is shown in FIG. 14. This is done to restrict access to the data, and provide for supplemental billing if the data is not returned within the rental period. VPR/DMS 30 receives content and associated control data at the receiver 2 (see FIG. 7).

In a preferred embodiment, network interface 10b is the high-speed connection to the digital data content providers through which the VPR/DMS receives the digital movie data. Receiver 2 may include digital signal processors, and compression algorithm hardware and/or software to compress the received data for storage on the built-in storage device. Digital data (compressed or uncompressed) may be received from the receiver 2, which then records the data onto the built-in, non-movable storage device 14. It should be noted that like the previous embodiment, the data storage device 14 is nearly simultaneously accessible by separate read and write heads so that data may be read virtually at the same time it is written. Thus, the user is not required to wait until all of the movie data has been received before viewing or otherwise manipulating the movie data.

Once movie data has been stored on the built-in non movable storage device 14, the data may be played back by the system, or transferred to a portable medium for use on a movie player outside the system, but only if allowed by the content provider and commercial transactions associated with delivery are completed. Considering the playback example, the system operates much like the playback system in the Automatic Digital Recorder/Player Embodiment above. Data is transmitted to the microprocessor 12 and to the content filter/editor where it may be further processed prior to playback according to pre-selected or on-the-fly options. Some on-the fly selections may include, for example, choices from among different formats (wide screen versus NTSC format), or user may select added features unique to the rented movie data, such as viewing movie data by chapter, accessing movie credits, director's comments, actor bios, movie trailers, etc. Pre-selected options may include ratings or content based editing as described above.

Once the data has been processed according to user selection, it is output to the playback circuit 27 for playback on an analog or digital television or monitor, and/or through a stereo with analog and/or digital inputs, or stored on the built-in non movable storage device 14. As detailed above, playback circuit 27 may include signal processors and decoders and digital-to-analog decoders (DAC) to transform digital audio/video data to analog form to be output at output connector 20*a, b*, or *c*. Additionally, digital data may directly output via digital output connector 20*a, b*, or *c*, to components with built-in digital decoders, without first being decoded, thus preserving the integrity and quality of the digital sound and picture.

Rather than playing back the movie from the built-in non-movable storage device 14, the user may wish to record the data onto a portable recorder/player 19 or other portable storage media. In this case, the user may transfer the data from the built-in storage device 14 to a portable recorder/player 19. This may be accomplished in at least two ways. First, since the preferred embodiment includes a built-in portable media recorder/player 19, the user may simply select an option from the user interface 17 to transfer the data to a media in the built-in portable recorder player 19. If this option is selected, the user places a blank DVD (or DVD-R or DVD-RAM) disc into the portable recorder/player 19, and selects the transfer option. The micro-controller 31 reads the movie data from the built-in storage device 14, and transmits it to the microprocessor 12.

The microprocessor 12, using techniques known in the art, may add copyright protection (e.g., Macrovision DVD, SCMS, etc.) to the data to prevent additional copies from being made from the copy. In addition, the processing unit may include control data on the disc, which uniquely identifies the disk based on the rental information unique to that rental agreement. The micro-controller 31 stores control data information in a memory unit 32 for later use in the return process. The control data information is necessary for the system to track and account for all "copies" of the rented movie that may be made by the user. It should be noted that the control data stored on the disc does not affect playback of the data content, but merely serves to identify the disc as containing movie data related to a specific rental agreement. An illustration of imbedded control data is shown in FIG. 14. The DVD disc now contains all of the movie data, which may be accessed by any DVD player known in the art, on an unrestricted basis (i.e. as many times as one wants, and on any player).

An alternative method includes usage of a stand-alone DVD recorder (or similar device e.g., a personal computer with built-in DVD recorder) which may be attached to one of the digital I/O ports or via computer interface. In this respect, the same operations may occur except that from the built-in storage device 14 the digital data is transmitted through the playback circuit 27, through a digital output (or computer I/O interface) to the outside DVD recorder. Note that the transmitted data may include content data, copy protection data, and control data assigned by the processing circuit to uniquely identify the device.

It should be noted again that when the rental agreement period has elapsed, the user may perform a "virtual return" of the movie data, including any copies made. This "virtual return" may be an "auto return", where the data is automatically erased at the expiration of the rental period. Or it may embody an automatic cancellation of an access key code which prevents further access. At the time of return, the user accesses the system via the user interface 17. The system alerts the user that a movie is due to be returned, and offers several options, including returning, or renewing. If the user renews, then the VPR/DMS 30 proceeds to access the remote ATS 29 (FIG. 6) and instructs the server to renew the rental charge the account. If the user decides to return the movie, then the micro-controller 31 accesses the memory unit 32 to retrieve rental information and control data information relating to the rented movie. If a copy has been made for use on outside players, then the VPR/DMS 30 queries the user to insert a disc or tape into the portable medium player/recorder 19. The micro-controller 31 reads the control data information on the disc to make sure that the disc is the proper one. When this is confirmed, the programming in the VPR/DMS 30 causes the portable medium recorder/player 19 to erase the disc or otherwise render it unusable. Next, the micro-controller 31 issues instructions to delete the movie data from the built-in digital storage device 14. Finally, the micro-controller 31 signals the remote ATS 29 that the movie data has been properly erased from the built-in storage device 14, and any portable copies that may exist. The ATS 29 then contacts the data content provider that provided the movie to confirm that the movie has been "returned". Finally, the ATS 29 records the rental transaction as having been finalized and completed. The provider may also allow the data product to be purchased for a fee as hereinafter described.

Virtual Video Game Rental

Virtual Video Game rental is operationally the same as the Virtual Movie Rental, except the data is video game data (e.g., SONY PLAYSTATION, NINTENDO 64). Data is stored on built-in storage device 14, and output from digital output to re-writeable adapter cartridge, which may be inserted into a game console. A return is initiated by deleting the rented software from the built-in storage device 14 and notifying the digital data provider that the transaction is completed.

Virtual Software Rental

Virtual software rental is operationally the same as the Virtual Movie Rental, except the VPR/DMS keeps track of copies, and requires all copies to be deleted to initiate a return as earlier described. Interface with computer is required to transfer software to and from CPU.

Virtual Purchases (Movies, CD's, Games, Software)

Virtual purchases are operationally the same as the Virtual Rentals, except once purchased, the data is the user's to manipulate. The VPR/DMS system incorporates standard copyright protection on all copies. User may transfer to portable medium once, and then data on built-in medium is erased so that the copyrighted material may not be illegally duplicated. The purchase essentially allows unlimited access to the data for viewing. However, the present invention prohibits any illegal duplication.

Data Box—Individual Storage Units

The VPR/DMS 30 can be utilized by individuals for capturing, processing, and/or playback of received broadcasts according to their own programmable suitability criteria. Similarly, the system's apparatus for capturing and processing multiple data feeds can be subdivided into multiple units for which a single user may assign various recording/processing functions to individual data box storage units for a multitude of purposes. For example, a user can pre-program the system to automatically record all TV programs (or segments) received from all or specific broadcast channels that have specific themes. Examples include comedy shows, western, high tech, mysteries, financial interests, actors, etc. This thereby creates a virtual broadcasting network with multiple channels, each of which are customized to suit the user's suitability criteria.

The user/may designate specific Data Boxes to automatically capture and process data feeds from such diverse sources as for network TV, satellite TV/music channels, cable transmissions, telephone communications, facsimile transmissions, Internet data, advertising data, subscriptions to on-line magazines, radio. In doing so, the multi-functional processor recorder becomes a versatile data management system for routing, capturing, processing, combining, accessing, display/playback, and/or downloading to portable devices any and all multiple data feeds received along various transmission sources.

The user may designate a partition in his individual Data Box to hold only advertising information which has been processed and customized according to his unique user suitability criteria. This information may be communicated back to the broadcaster/content provider to allow advertising or video catalogues sent to the user to be more on target as to the user's preferences.

Besides receiving preferred advertising and catalogues, the VPR/VMS allows the user to scan content backwards and forwards, as well conduct transactions to rent, purchase, pay-per-view out of the data box functions directly through the system.

Instantaneous Playback

The user can activate an Instant replay function of the VPR/DMS by pressing an Instant replay, a reverse scan button or a swing shuttle knob located on the remote control or on the VPR/DMS 30 unit. These functions are available for use during real time viewing/recording and for viewing previously recorded data (movies, etc.). While viewing a program in real time, user may at any time press the replay button which activates the rewind or a relocate playback feature for reviewing the last few seconds (or minutes) of the program. Such time lengths are programmable by the user. This may occur while the program is being viewed in real time and being recorded simultaneously on the built-in, non-movable storage device 14. This replay function is programmable to review a pre-selected or pre-programmed number of seconds or minutes of programs being viewed in real time according to the user's preference. It also allows for variable replay time frames by pressing the replay button (or turning rewind shuttle knob) allowing user to spontaneously select the instant replay time frame indicated on the on-screen display. Once the user has completed viewing the replay segment, the unit will automatically shift to the real time viewing mode, or if desired, the user may re-commence viewing of the program at the point of pause which also continues to record the program. At the same time, the system continues to record the program by the use of multiple read/write operations. The system registers all pauses in "live or real time" viewing by timing based on the location of cue points automatically registered in system memory for automatically returning to view the program at the point of pause or instant replay.

The recording modes for such instant replay features include both continuous loop in a designated time frame, or continuous recording to the end of the storage capacity. The continuous loop mode is particularly useful. Regardless of how long the user records a broadcast or other data feed, the last few seconds, minutes, or even hours of programs being viewed in real time can be instantly replayed. The system will automatically record over initially recorded storage areas located on recording tape, optical disc, hard drive, or other built-in, non-movable storage device 14.

Since the VPR/DMS 30 includes both multiple storage device; and multiple data boxes, the instant replay features can be activated for review during several recording modes. This includes multiple programs being recorded simultaneously, as well as programs that have been previously recorded. These multiple programs may be displayed in full screen, split screen, or Picture-In-Picture display formats.

Pause-N-Return or Stop-N-Go Functions

Figure 18:
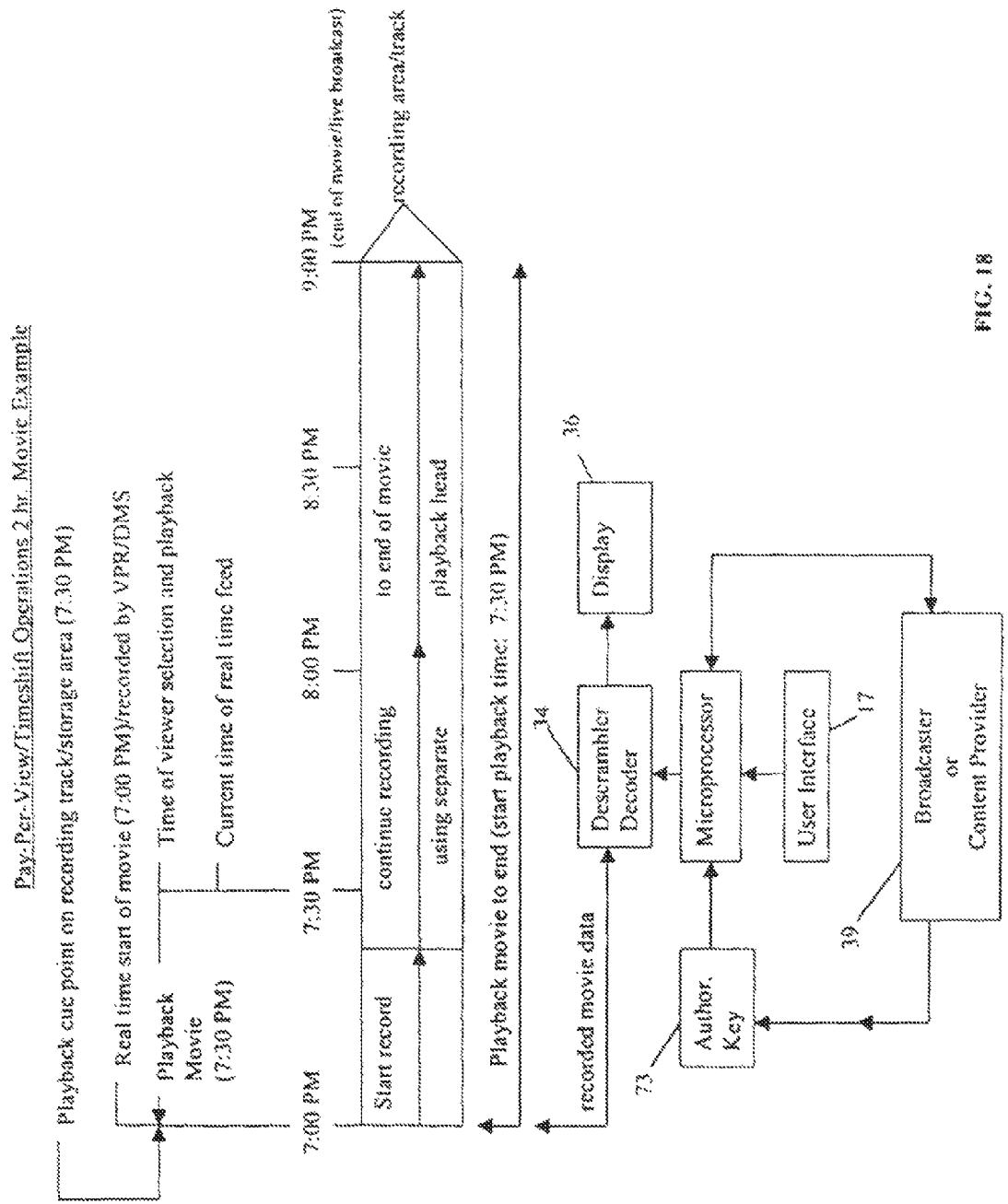
FIG. 18 is a schematic representation of Pay-Per-View/Time shift Operation of the present invention, illustrating an example of a two hour movie recording and playback sequence.
Figure 19:
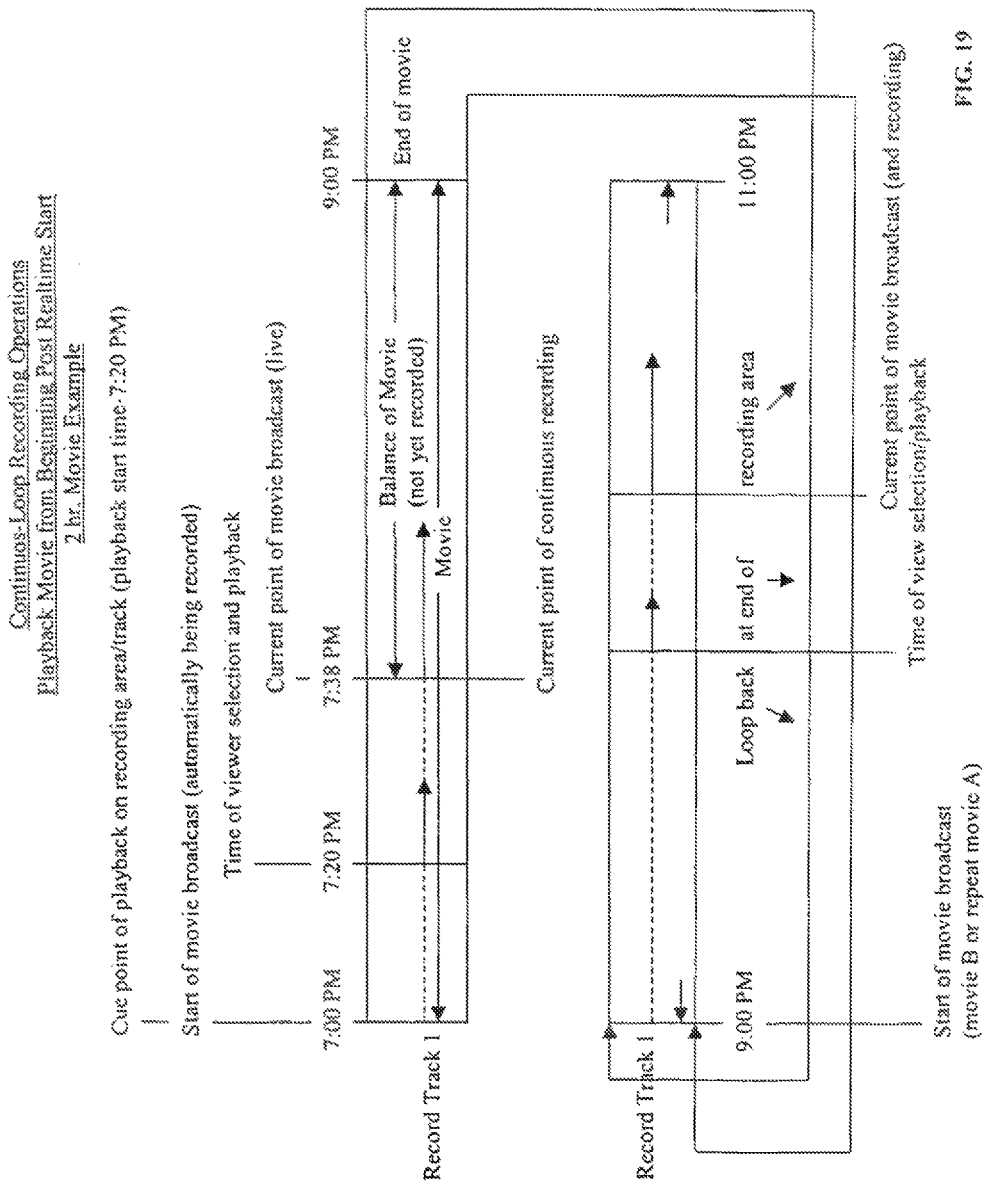
FIG. 19 is a schematic representation of Continuous Loop Recording Operations of the present invention, illustrating a playback of a movie where there is a temporal offset between real time recording and a delayed playback.

Referring now to FIGS. 18 and 19, the manner in which the VPR/DMS 30 of the present invention initiates pause-n-return or stop-n-go functions is illustrated. The VPR/DMS 30 of the present invention provides that a user may pause live viewing of a broadcast program and return later to continue viewing the program from the point of pause through to end of the program. This may occur even if the program is still in progress. If the user pauses live program viewing while the VPR/DMS is not in any recording mode, then the user activates a "pause n' return" button. This button instructs the system to instantly begin recording the program while also automatically registering the pause cue point in system memory for use later. This process may be repeated as often as necessary.

When the user returns to continue viewing, a "return to view" button may be utilized which automatically locates and begins playing back the program from the precise cue point 23 which the user paused live, real time program. At that point the system continues to record the program using a read/write device, and continues to record the program through to its ending. The system continues to playback the recorded program in normal viewing sequence. The functionality is repeatable any number of times allowing the view to raise-n-return to continue viewing in normal continuous sequence regardless of how many minutes, hours, or even days the user takes to view the entire program. Although the system will function in this manner in use with various recording and storage formats, the preferred embodiment includes use of one or more high capacity hard disk drives with random access memory operations.

"Late to View" or Time Shifting Functions

Referring now to FIGS. 18 and 19, the manner in which the VPR/DMS 30 of the present invention initiates "late to view" or time shifting functions. The VPR/DMS 30 may be programmed to begin a recording of a broadcast program or broadcast channel at a specific time in both normal recording mode or in continuous loop mode. If the user arrives late to begin viewing a broadcast program or channel which has already started, the system will automatically locate and register in systems memory, the cue point of the program being recorded. It will then begin playing back the program from its beginning through to its ending, regardless of whether or not the program is still in progress, while at the same time continue recording the show to its ending by use of multiple read/write heads or random access memory operations provided in the system. Additionally, the user may take advantage of "Instant Replay" and "Pause-N-Return" functions. In effect, this system provides that a user will never be late to view a favored broadcast.

Referring now to FIG. 13, the user may program the system to capture digital data products from a single or a plurality of broadcast channels at the same time. A microprocessor in the system has software programming to control the operation of the processing circuitry and the playback circuitry. The software programming interacts with the non-movable storage device 14 and the playback device 15 to allow recording of the digital data products as they are broadcast. The software programming further interacts with the playback circuitry to allow the data to be played back from a cue point, paused on command, and restarted from the cue point, while the data are being continuously recorded without interruption.

The data may be subject to either pay per view, purchase or rental restrictions by the broadcaster/content provider. When this occurs, the data is still received and recorded, but in a format that prohibits viewing by the user until the commercial transaction has been completed. The data may be scrambled, encrypted, or otherwise locked from viewing until the user agrees to pay for access. However, the data is already stored on the users local VPR/DMS, so the commercial transaction may take place locally on a remote ATS. Once the commercial transaction is completed, the digital data product provider exchanges a digitally encoded electronic access key to the scrambled, encrypted, or otherwise locked data.

In this way, the user may come home only to find that his or her premium program of choice started, say fifteen minutes prior. In prior art devices, the entire body of programming content, in this instance would be missed or viewed 15 minutes into the program. However, because the user pre-programmed the system to capture a broad band of programming channels or specific programs during the period before the program started, the entire program is still instantly accessible, even while the program is still being recorded. The access key is obtained allowing the user convenient and discretionary viewing privileges. If the scrambled or encrypted digital data isn't accessed, the system may record over it later. This unique function provides improvements for both the end user as well as increasing pay-per-view sales by effectively synchronizing program starting times with convenient user access time schedules.

Expanded Continuous Loop Recording

Referring now to FIGS. 18 and 19, the manner in which the VPR/DMS 30 of the present invention initiates continuous loop recording. The continuous loop recording functions in the VPR/DMS of the present invention have many useful purposes when applied to both "free" channel broadcast data and fee based/subscription broadcasts. When applied to free broadcasts, for example, a network television broadcast, or any received broadcast where no pay-per-view transactions are required for immediate access to a program, this feature provides that even when a user is late to arrive to view a program which has already started, he/she may view the program from its beginning through to its ending. First the user scans broadcast channels or program menu displays to determine desired programs already in progress which have been recorded by the VPR/DMS via any methods previously described. Upon selection by user via remote control or via buttons on VPR/DMS the system automatically locates the starting point of the broadcast program (TV show, movie, audio track, etc.) which has been recorded onto system's built-in storage device, preferably a hard disk drive for this application. The system simultaneously continues to record the remainder of the broadcast (unless entire broadcast has been fully recorded) using multiple read/write heads and random access operations with hard disk drive system. The system is also instantly programmable to automatically disengage the continuous loop recording process if the user, in addition to viewing the broad, cast in "view time" (time shifted real-time viewing), wishes to capture the program in its entirety for viewing at a later time. Any and all processing functions described previously (VPR/DMS) are applicable to said recorded program such as for data, scrambling, program customization, compressed data, commercial skip, ratings edited, and all processing can be done before and/or after recording. This continuous loop recording process is useful for allowing user to scan backwards all broadcasts received within a limited time period (limited only to the total recording capacity of the built-in storage device or designated storage areas on the device assigned for such purposes). Therefore, when a user has not programmed the system for recording specific broadcast programs, then this feature provides instant access to hours of previously received broadcasts for selection and viewing. The hard disk drive system provides such capabilities for 20 hours or more, or dividable storage capacity assigned to individual broadcast channels. For example, the total storage capacity of 20 hours equally assigned over 10 broadcast channels allows for a user to view any program(s) received within the last 2 hosts over any of the 10 channels from the beginning of the program through to its ending. Alternately, a user may program the system to record specific programs or programs automatically selected via system discretionary filter/editor system based on programmable user suitability criteria. In this way, the user may view, for example, all comedy programs received within the allotted, time period (continuous loop recording capacity) instead of only recording specific programs and then deactivating recording when storage capacity is reached. The continuous loop recording mode can be pre-programmed to activate and deactivate at any time desired by user. This feature is also necessary for providing instantaneous playback ("instant replay") and backwards program scanning as previously described in that the system continues to record received broadcasts even when data storage capacity is full.

These functions are also very well suited for enhanced pay-per-view, fee-based channels, and subscription program applications. When applied with the continuous loop functions described above, many new and useful functions are provided. For example, the process described above can be assigned to one or more pay-per-view channels for recording all broadcasts received over the previous 3 hours (capacity of continuous loop storage designated to the channel). In this way, the user may "purchase" a number of pay-per-view broadcast programs currently in progress (movie, etc.) and view the entire program from its beginning even if he or she is late to arrive for the beginning of the real-time start of the program. This application of the system effectively solves the most prevalent problem of know pay-per-view delivery formats: failure to match viewer's time of convenience with real time start of programming. The value to both broadcasters and consumers may be easily seen. Additionally, these capabilities become even more advantageous when all other VPR/DMS functions are available, such as instant replay, backwards and forwards scanning, customized program processing/editing, multi-format broadcast processing, utilization with individually accessed storage units (data boxes), as well as applications with all other VPR/DMS rental/purchase capabilities.

Any or all of these functions may be applied to the pay-per-view premium subscription programs which allows not only a virtual "on-demand" audio/video system, but also provides delivery of video programs and other data products which are customized to the end user's suitability.

Video-On-Demand

Figure 20:
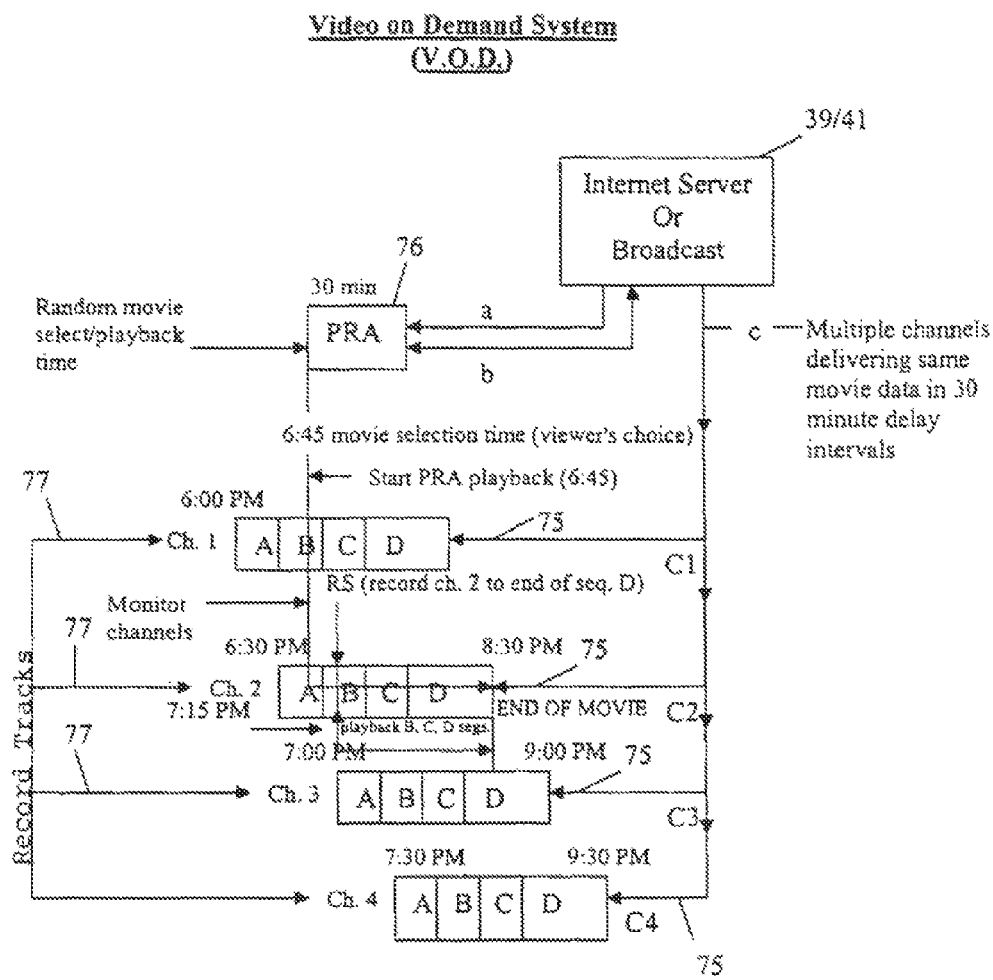
FIG. 20 is a schematic representation of the Video-on-Demand System, illustrating how data flows from a broadcaster into the VPR/DMS of the present invention, and how it may be recorded on a plurality of tracks having temporal offsets.

Referring now to FIG. 20, a schematic representation of the Video-on-Demand System, illustrating how data flows from a broadcaster into the VPR/DMS of the present invention, and how it may be recorded on a plurality of tracks having temporal offsets.

The invention may be used for providing Video-On-Demand (V.O.D.) or Near-Video-On-Demand (N.V.O.D.) functions in use with multiple television broadcast channels or via Internet broadcasting 39. For these functions the system utilizes pre-stored initial data program segments. In this example an initial movie segment (PR-A) 76 of 30 minutes (or longer) in length in conjunction with (4) standard TV/movie broadcast channels. Each of the (4) broadcast channels transmit the exact stream of data representing the same movie (2 hr movie in this example) but in 30 minute time delayed intervals. Upon selection by viewer at anytime between the hours of 6:00 p.m. and 8:00 p.m. (beginning of last segment B to be broadcast that day in this example) and following any necessary fee transactions, playback of pre-stored initial movie segment (PR-A) 76 begins at 6:45 p.m. in this illustration. If the movie is a pay-per-view movie, then upon selection and completion of fee transactions the initial movie segment (PR-A) is unscrambled or otherwise unlocked for display in normal viewing format.

The pre-storing of initial data/program segments (movies, etc.) can be accomplished in several ways, including:

1. automatically recording an initial program segment at the time a regularly scheduled program is being broadcast; or 2. single or multiple initial program segments may be transmitted by broadcasters along channels designated for such purposes, via the Internet, downloaded from a portable storage media, or by other transmission means for storage in the VPR/DMS system within storage areas designated for such purposes and utilized for the V.O.D./N.V.O.D. operations described above.

At the time of selection and playback of PR-A 76, the system simultaneously and automatically begins monitoring all (4) broadcast channels 75, i.e. (ch1, ch2, ch3, ch4) on which the same movie is to be broadcast in time delayed intervals. The system automatically selects channel (2) at the precise time (or slightly before) the beginning of segment B when broadcast in real-time (7:00 p.m.) (RS on figure). The recording of the movie broadcast on channel (2) will continue until the entire movie has been recorded (8:30 p.m. in this example). Once playback of pre-stored initial segment PR-A 76 is completed, the system automatically begins immediately playing back the now recorded movie segment (B) from its beginning which as been precisely located by use of either a data bit cue point identification system. This might include broadcast transmission of control information data received and stored in system memory received along with or prior to the movie data, or the system may utilize a clock timer system which identifies the beginning of segment B on channel 2 (by way of a time delay calculation or time synchronization method).

If the VPR/DMS 30 contains only one playback head, then the system is programmable to automatically switch from playback of PR-A segment to a recording track 77 used for recording movie segment B. Whenever adequate space is available immediately adjacent to the recording track containing the pre-recorded PR-A segment, the system will automatically select that storage area on a Hard Disk Drive (in this example) for recording the movie segment which follows the initial segment (PR-A) for seamless playback of the entire movie. The system continues playback of all remaining movie segments (B,C,D) which are still being recorded by use of systems having simultaneously read/write capabilities described previously. In this example, the real-time movie broadcast on ch (2) selected for use ends at 8:30 p.m., at which time the recording of the movie on ch (2) also ends. Playback of the movie segments received on channel (2) and simultaneously recorded continues and concludes at 8:45 p.m., which is (2) hours subsequent to time of viewer selection and playback of pre-stored initial segment (PR-A) which began at 6:45 p.m. Again, the system and methods described above provide a solution to the existent problems of matching broadcast schedule times with time of convenience of television or Internet broadcasting viewers. These functions are equally applicable to "free" broadcast channels or fee based broadcast programming (pay-per-view, etc.). The latter might necessitate on-line direct fee transactions all within the system's "transaction zone" followed by broadcaster authorization for unscrambling or unlocking the pay-per-view movie (in this example) for immediate access by the system user.

Note that the process described above and illustrated in FIG. 20 represents only one example of the V.O.D. or N.V.O.D. functions of the invention. Any number of similar broadcast formats may be easily configured and utilized by the VPR/DMS system for creating V.O.D. or N.V.O.D. capabilities. For example, a premium channel broadcast network such as Direct TV, HBO, or SHOWTIME may broadcast the same movie over three different channels in 20 minute time delayed intervals offering their subscribers a total of only (3) movie starts (as opposed to (4) starts in the example above) which more likely than not will not match the viewer's preferred time of convenience. By use of this invention, the pre-storage of an initial movie segment of at least 20 minutes in length will provide that (V.O.D.) between the times of the beginning of the first of the three broadcast starts and prior to the beginning of the second 20 minute segment of the third broadcast of the 2 hr. movie in this example. In these ways the system may for example pre-store up to 60 initial movie segments (20 minutes long) on one hard disk drive having a total data storage capacity of 20 his. This allows the end user to select and playback on-demand up to 60 different movies (or other programs), each of which are broadcast over multiple channels in 20 minute time delayed intervals.

Other Commercial Aspects

In addition to the system's capabilities for downloading data products to portable media which have been received directly by end-user via broadcast signal or other data transmission means, the VPR/DMS of the present invention is capable of storing, processing, and playback of data products (i.e., movies, computer games, etc.) which have been pre-recorded* onto any type of portable storage device (CD, DVD, VHS tapes, etc.) in unique recording/playback formats adapted for use by VPR/DMS recorder/players as described previously. In this embodiment of a commercial based VPR/DMS system all unique VPR/DMS functions as previously described for uses with portable storage devices would be identical, except that the recording of the data product would occur prior to rental or purchase of pre-recorded portable storage device by end-user.

Additionally, the recording process might include all other unique formatting techniques previously described including (some or all) copy protection, embedded control data, product identification data, consumer identification data, transaction/account data, rental/purchase transaction data, multi-formatted data, and all other formatting methods previously described for controlling all rental/purchase functions as well as unique record/playback functions enabled by the invention.

Besides the availability of such pre-formatted pre-recorded VPR/DMS data products through mail order or retail distribution, the system might also be conformed to provide on-site (retailer, mail order, Blockbuster, etc.) recording of customized data products for rental, purchase, or rental/purchase to consumers for use on their home based VPR/DMS (or portables or public access systems). In this way a data product provider/distributor can format and record a movie (for example) according to specific user suitability criteria provided by the customer, or otherwise customized to conform to various pre-selected criteria known to be popular or suitable for various customer groups such as based on ratings, or price based on sophistication of user playback options as formatted and recorded on the DVD, VHS tape, C.D., etc. To allow this commercial operation, similar to functions described for direct delivery of data programs to end-user system, the commercial based VPR/DMS would receive bulk data products (movies for example) via broadcast or other data transmission from content providers (i.e., Internet, etc.) for storage within its commercial VPR/DMS, preferably stored on a built-in non-movable storage device such as a high capacity HDD. Subsequently, a retailer (for example) can download a customized version of a data product (movie, etc.) onto a highly formatted, copy protected VPR/DMS portable storage device for sale or rental to customers for use on their VPR/DMS systems. All functions for negotiating rental and purchase transactions as previously described for direct transmission to home-based VPR/DMS systems are equally effective for rental or purchase of pre-recorded data products as described above. However, alternatively to automatic "return" of data products (i.e., erasure, scrambling, etc.) customers may be required to physically return a pre-recorded VPR/DMS data product for subsequent resale, re-rental, or erasure by retailer or product distributor.

As previously described, rented and purchased VPR/DMS data products are securely controlled via copy protection, embedded control data, and other techniques. However, contrary to existing rental/purchase formats (i.e., DIVX), it is not necessary that the data product be recorded in a scrambled format. Therefore, under easily managed negotiations with content providers, a VPR/DMS portable storage device may be utilized with existing (or future universal) recorder/players following any necessary rental or purchase transactions with content providers. Alternately, the system is fully capable of scrambling and unscrambling data stored internally or onto a portable media while under proprietary control by content providers as previously described, yet maintaining the capability for permanently descrambling the data product for transfer to a portable storage device (C.D., DVD, VHS tape, etc.) for use with conventional recorder/players. Thus the fears by consumers to invest in specialized recorder/players or to collect libraries of products which can only be played back on specialized players (i.e., DIVX, etc.) is eliminated.

Additionally, for use by commercial product distributors or by end-users, "blank" VPR/DMS portable storage media (i.e., CD, DVD, VHS, etc.) can be produced which have been formatted at the factory or distributor level to include unique VPR/DMS control data and product information data (as described above) for customizing data products, for maximizing unique VPR/DMS recording, processing, and playback functions, or other for use in controlling all rental/purchase transactions described previously.

Copyright Collection/Monitoring Functions

In addition to storing and processing transaction data or other control information data, the VPR/DMS is capable of electronically monitoring and logging all rental, purchase, or pay-per-view transactions as well as end user access operations (i.e., playbacks, downloads, etc.) of data programs and products which are copyrighted, patented, licensed or otherwise represent proprietary intellectual property. This electronically logged data might then be automatically transmitted to or retrieved by content providers or by copyright collective organizations such as ASCAP, BMI, SESAC, etc. for collection of licensing fees or other purposes. Otherwise, these licensing and distribution mechanisms might be executed by random sampling, periodical monitoring or retrieval of statistical data about distribution, broadcast, re-broadcasts, downloads to portable media, or other use of proprietary intellectual property by direct (or indirect) access to such data stored within the VPR.DMS or at an associated database. These same invention capabilities can also be utilized by both content providers and end-users for compiling and analyzing activity specific statistical data for producing end-user profile data which can then be used for directing transmission, storage and custom processing of data products, programs or advertisements which are most suitable for end-users. Effective employment of these operations is enhanced by the use of various VPR/DMS processing capabilities described herein including: compartmental data storage and processing, embedded control data (TAGS) processing, data encoding and decoding copy protection features (such as Macrovision, watermarking, etc.), direct microprocessor control by content provider, and other invention features described herein and illustrated in the figures.

What is claimed is:

1. A system for providing targeted advertising to a multimedia content end user, comprising:
    at least one storage device, wherein at least one of said at least one storage device comprises at least one addressable and reserved storage space for storing digital advertising data;
    at least one processor; and
    software implemented by said at least one processor wherein said software comprises a program to reserve said at least one addressable storage space and wherein said software further comprises a program to select particular advertising data suitable for targeting to at least one end user based upon predefined criteria data, wherein particular advertising data is stored in said at least one addressable and reserved storage space and is accessible to the at least one end user.

2. The system of claim 1, further comprising an end user receiver, wherein said at least one storage device that comprises said at least one addressable and reserved storage space is located within said end user receiver.

3. The system of claim 2, further comprising a central control unit in communication with said end user receiver, wherein said central control unit processes profile data associated with the at least one end user to generate the predefined criteria data, and manages delivery of the particular advertising data to said end user receiver for automatically storing the particular advertising data in said at least one addressable and reserved storage space.

4. The system of claim 1, wherein the suitability criteria data comprises a key word.

5. The system of claim 1, wherein the suitability criteria data is collected by at least one method selected from the group consisting of monitoring at least one activity of an end user, monitoring a search routine of an end user, monitoring a key word, monitoring an end user inquiry, monitoring a selection of media content by an end user, monitoring a selection of television programming by an end user, monitoring playback of a media program, monitoring an advertising preference of an end user, monitoring a product rental or purchase by an end user, monitoring a broadcast time schedule, examining end user profile data, examining demographics, and combinations thereof.

6. The system of claim 1, wherein the particular advertising data is stored in said at least one addressable and reserved storage space and wherein said at least one processor comprises processing circuitry configured to dynamically merge the particular advertising data with digital media content for presenting the particular advertising to the at least one end user during playback of the digital media content.

7. The system of claim 1, further comprising an end user receiver associated with the at least one end user, wherein the particular advertising data is stored in said at least one addressable and reserved storage space and wherein the particular advertising data is dynamically merged with digital media content received in real time by said receiver for the presentation of the particular advertising data during playback of the digital media content in real time.

8. The system of claim 1, wherein said system manages delivery of the targeted advertising data to a selective group of end user receivers according to a selected advertising placement option, wherein said system is configured to automatically produce at least one optimal advertising placement option for delivering targeted advertising data to the at least one end user, and wherein said at least one optimal advertising placement option is based upon analysis of at least one criteria from a group consisting of: a total number of customers, customer profile data, customer suitability data, customer demographics, available storage space within an end user receiver, available advertising formats, available advertising schedules, advertising rates, ad placement timing, program schedules, product showcase schedules, cost effectiveness, and combinations thereof.

9. The system of claim 1, wherein the particular advertising data is carried in one or more data feeds, wherein said system further comprises at least one monitoring channel used as a channel for filtering data carried in the one or more data feeds, wherein said software program comprises a content filter operably coupled with the at least one monitoring channel and configured for locating the particular advertising data carried in the one or more data feeds by decoding embedded control data associated with said particular advertising data, and wherein said at least one processor is configured to access the particular advertising data from the one or more data feeds and to automatically store the particular advertising data in said at least one addressable and reserved storage space.

10. The system of claim 9, wherein the one or more data feeds is a digital television feed comprising a plurality of digital television channels, and wherein said content filter is configured for simultaneously filtering the data carried in the plurality of digital television channels and to automatically store the particular advertising data in said at least one addressable and reserved storage space.

11. The system of claim 1, wherein said at least one addressable and reserved storage space is rented by an advertising provider for delivering the particular advertising data to at least one end user receiver and for storing the particular advertising data in said at least one addressable and reserved storage space.

12. The system of claim 1, wherein said at least one storage device is located remotely from the at least one end user, wherein said system further comprises a communications interface configured to enable the at least one end user to remotely program said system to record digital media content for storage in the at least one storage device, wherein the particular advertising data is merged with the digital media content to create combined digital media content, and wherein the combined digital media content is delivered to the at least one end user on demand.

13. The system of claim 1, wherein the particular advertising data is selected by said at least one processor decoding control data associated with the particular advertising data.

14. The system of claim 13, wherein the control data is data used to identify a key word.

15. The system of claim 1, wherein the particular advertising data is advertising data that is pre-classified as a particular category of advertising data, and wherein said at least one addressable and reserved storage space comprises storage space for storing a particular category of advertising data.

16. The system of claim 1, wherein the particular advertising data stored in said addressable and reserved storage space is located in a first end user receiver, wherein a second end user receiver is identified by a central control unit as being associated with the first end user receiver, wherein the central control unit communicates with the second end user receiver, and wherein the central control unit manages the delivery of the particular advertising data to the second end user receiver.

17. The system of claim 16, wherein the particular advertising data is combined with digital media content to create combined digital media content and wherein the central control unit manages the delivery of the combined digital media content to the second end user receiver device.

18. The system of claim 16, wherein the second end user receiver is a portable digital recorder/player, and wherein said system maintains at least one record from a group consisting of: identification of the second end user receiver, identification of the portable digital recorder/player, identification of the delivery of the particular advertising data to the second end user receiver, identification of the particular advertising data, account information for the at least one end user, an access by the at least one end user of the particular advertising data, and combination thereof.

19. A device for providing targeted advertising to an end user, comprising:
 at least one input port for receiving digital multimedia data, wherein the digital multimedia data comprises particular advertising data for targeting to at least one end user based upon predefined criteria data associated with the at least one end user;
 at least one storage device;
 at least one addressable and reserved storage space for storing the particular advertising data;
 at least one processor configured to reserve said at least one addressable storage space and to present the particular advertising data to the at least one end user.

20. The device of claim 19, wherein the digital multimedia data further comprises program selectable advertising data for targeting to at least one end user based upon the program selectable criteria data, and further comprising:
 a software program implemented by said at least one processor to select, based upon the program selectable criteria data, the particular advertising data from the program selectable advertising data.

21. The device of claim 20, wherein said particular advertising data is selected by said at least one processor by said at least one processor decoding control data associated with said particular advertising data.

22. The device of claim 21, wherein said control data identifies a key word.

23. The device of claim 19, wherein a central control unit located remote from said device is configured to perform a function selected from the group consisting of managing delivery of the data to the receiver, directing storage in the reserved storage space, dynamically merging with content, controlling sending an advertisement to a portable device, and combinations thereof, and wherein the central control unit processes profile data associated with the at least one end user to generate the suitability criteria data.

24. The device of claim 23, wherein the central control unit comprises a software program to select, based upon the program selectable criteria data associated with the at least one end user, the particular advertising data from the program selectable advertising data.

25. The device of claim 19, wherein the suitability criteria data is collected by at least one method selected from the group consisting of monitoring at least one activity of an end user, monitoring a search routine of an end user, monitoring a key word, monitoring an end user inquiry, monitoring a selection of media content by an end user, monitoring a selection of television programming by an end user, monitoring playback of a media program, monitoring an advertising preference of an end user, monitoring a product rental or purchase by an end user, and combinations thereof.

26. The device of claim 19, wherein the particular advertising data is stored in said addressable and reserved storage space and wherein said at least one processor comprises processing circuitry configured to dynamically merge the particular advertising data with digital media content that is pre-stored in said at least one storage device for presenting the particular advertising to the at least one end user during playback of the digital media content.

27. The device of claim 19, wherein the particular advertising data is stored in said addressable and reserved storage space and wherein the particular advertising data is dynamically merged with digital media content received in real time by said receiver for the presentation of the particular advertising data during playback of the digital media content received in real time.

28. The device of claim 19, wherein the particular advertising data is configured for presentation to an end user by a method selected from the group consisting of a dynamic insertion of the particular advertising data in or around a user selected media program, a transfer of the particular advertising data to a second end user device, a menu screen, a header, a footer, an picture in picture, a split screen, an overlay, a keyword search item, a user selectable interactive advertisement, and combinations thereof.

29. The device of claim 19, wherein the particular advertising data is carried in one or more data feeds, wherein said system further comprises at least one monitoring channel used as a channel for filtering data carried in the one or more data feeds, wherein said software program comprises a content filter configured for locating the particular advertising data carried in the one or more data feeds by decoding embedded control data associated with said particular advertising data, and wherein said at least one processor is configured to access the particular advertising data from the one or more data feeds and to automatically store the particular advertising data in said at least one addressable and reserved storage space.

30. The device of claim 19, wherein said at least one addressable and reserved storage space is rented by an advertising provider for storing the particular advertising data in said at least one addressable and reserved storage space and for delivering the particular advertising data to the at least one end user.

31. The device of claim 19, wherein the digital multimedia data is advertising data comprising a plurality of advertisement formats and wherein said at least one processor is configured to select a particular advertisement format from the plurality of advertisement formats for targeting to the at least one end user based upon program selectable criteria data associated with the at least one end user.

32. The device of claim 19, wherein said device is a digital video recorder and wherein said at least one addressable and reserved storage space is a partitioned area of a hard disk drive.

33. A system for providing targeted advertising to a plurality of multimedia content end users, comprising:
 a central control unit operably connected to an advertising data server and in communication with a plurality of addressable and reserved storage spaces for storing digital advertising data, wherein at least one of said addressable and reserved storage spaces associated with a particular individual end user account is reserved specifically for access to said digital advertising data by at least one separate corresponding one of a plurality of end user receiver devices; and
 at least one processor comprising software configured to select particular advertising data based upon analysis of suitability criteria data to produce targeted advertising data for at least one of a plurality of end users and software configured to reserve said plurality of storage spaces, wherein each one of the end users is associated with a corresponding one of the end user receiver devices;
 wherein said central control unit manages the delivery of the targeted advertising data from the advertising data server to one or more of the end user receiver devices.

34. The system of claim 33, wherein each of said addressable and reserved storage spaces are located within a corresponding one of the end user receiver devices.

35. The system of claim 33, wherein said central control unit is configured to process profile data to generate the suitability criteria data for use in selecting particular advertising data suitable for targeting at least one of the end users.

36. The system of claim 35, wherein said central control unit manages delivery of the particular advertising data to one or more of said addressable and reserved storage spaces.

37. The system of claim 33, wherein said central control unit is configured to control delivery of digital media content selected by each of the end users to each of the corresponding end user receiver devices, wherein the particular advertising data is presented to each of the end users that selected the digital media content during playback of the digital media content.

38. The system of claim 33, wherein the suitability criteria data associated with at least one of the end users comprises a key word.

39. The system of claim 33, wherein the suitability criteria data is collected by at least one method selected from the group consisting of real time monitoring at least one activity of at least one of the end users, monitoring a search routine of at least one of the end users, monitoring a key word, monitoring an inquiry from at least one of the end users, monitoring a selection of media content by at least one of the end users, monitoring a selection of television programming by at least one of the end users, monitoring playback of a media program, monitoring an advertising preference of at least one of the end users, monitoring a product rental or purchase by at least one of the end users, and combinations thereof.

40. The system of claim 33, wherein the particular advertising data comprises embedded control data associated with said suitability criteria data, and wherein the particular advertising data is stored in a corresponding one of said addressable and reserved storage spaces and wherein said processing circuitry is configured to decode the control data for merging the particular advertising data with digital media content for presenting the particular advertising to at least one of the end users during playback of the digital media content.

41. The system of claim 33, wherein the particular advertising data associated with at least one of the end users is dynamically merged with digital media content to create merged digital media content that is delivered to at least one of the end users and stored in a storage space in a corresponding one of the end user receiver devices for presentation of the particular advertising data during playback of the merged digital media content.

42. The system of claim 33, wherein said central control unit is configured to process profile data to generate the suitability criteria data for use in selecting particular advertising data suitable for targeting at least one of the end users, wherein said central control unit manages delivery of the particular advertising data to one or more of said addressable and reserved storage spaces, and wherein control data associated with the suitability criteria data is embedded in a data stream carrying the particular advertising data for decoding by a processor for automatically storing the particular advertising data in at least one of said plurality of addressable and reserved storage spaces.

43. The system of claim 33, wherein said system is configured to automatically produce at least one optimal advertising placement option for delivering targeted advertising data to at least one of the end users, wherein the at least one optimal advertising placement option is based upon analysis of at least one criteria from a group consisting of: a total number of customers, customer profile data, customer suitability data, customer demographics, available storage space within at least one of the end user receiver devices, available advertising formats, available advertising schedules, advertising rates, ad placement timing, program schedules, product showcase schedules, cost effectiveness, and combinations thereof.

44. The system of claim 43, wherein the targeted advertising data is delivered to a selective group of the end user receiver devices according to a selected advertising placement option.

45. The system of claim 33, wherein one or more of said plurality of addressable and reserved storage spaces are rented by an advertising provider for delivering the targeted advertising data to at least one of the end users.

46. A method for providing addressable advertising for targeting to an end user, comprising:
   reserving an addressable storage space for storing program selectable digital advertising data;
   storing the program selectable digital advertising data in the addressable and reserved storage space;
   selecting, by a program, particular advertising data that is identified as suitable for targeting to at least one end user based upon predefined content selection criteria data;
   making the particular advertising data available to the at least one end user.

47. The method of claim 46, wherein the addressable and reserved storage space is located within a receiver device associated with the at least one end user.

48. The method of claim 46, further comprising:
   storing the particular advertising data in said addressable and reserved storage space; and
   merging the particular advertising data with digital media content to create combined digital media content;
   wherein said making comprises making the combined digital media content available to at least one end user.

49. The method of claim 48, further comprising storing the combined digital media content in a storage space reserved for storing combined digital media content.

50. The method of claim 46, further comprising:
   storing the particular advertising data in said addressable and reserved storage space;
   locating an existing advertising segment within digital media content;
   substituting the particular advertising data for the existing advertising segment; and
   wherein said making comprises presenting the particular advertising data to the at least one end user during playback of the digital media content.

51. The method of claim 50, wherein said locating comprises:
   locating the existing advertising segment within the digital media content by decoding control data.

52. The method of claim 50, further comprising storing the digital media content in an end user receiver device prior to said substituting.

53. The method of claim 46, wherein the suitability criteria data is collected by at least one method selected from the group consisting of monitoring at least one activity of the at least one end user, monitoring a search routine of the at least one end user, monitoring a key word, monitoring an inquiry from the at least one end user, monitoring a selection of media content by the at least one end user, monitoring a selection of television programming by the at least one end user, monitoring playback of a media program, monitoring an advertising preference of the at least one end user, monitoring a product rental or purchase by the at least one end user, and combinations thereof.

54. The method of claim 53, wherein said monitoring is performed in real time by a central control unit.

55. The method of claim 46, further comprising:
   producing at least one optimal advertising placement option based upon an analysis of at least one criteria from a group consisting of: a total number of customers, customer profile data, customer suitability data, customer demographics, available storage space within an end user receiver, available advertising formats, available advertising schedules, advertising rates, ad placement timing, program schedules, product showcase schedules, cost effectiveness, and combinations thereof, wherein said producing is performed by a central control until automatically; and
   wherein said making comprises delivering the particular advertising data to a selective plurality of end users according to the at least one optimal advertising placement option.

56. The method of claim 46, further comprising monitoring using a central control unit, wherein said monitoring is selected from the group consisting of: monitoring storage of the particular advertising data in the addressable and reserved storage space, monitoring selection of the particular advertising data for presentation to the at least an end user, monitoring playback of the particular advertising data by the at least one end user, monitoring delivery of the particular advertising data to a second end user receiver device, monitoring a transfer of the particular advertising data to a portable media storage device, monitoring a deletion of the particular advertising data, and combinations thereof.

57. The method of claim 56, wherein said monitoring comprises monitoring in real time by the central control unit.

58. The method of claim 46, further comprising:
   assigning at least one data control channel as a monitoring channel used for filtering, by a content filter, digital media content data carried on the at least one digital television channel;
   filtering the digital media content data for locating the particular advertising data that is suitable for targeting the at least one end user and;
   accessing the particular advertising data from the at least one digital television channel; and
   storing the particular advertising data in the reserved and addressable storage space.

59. The method of claim 46, wherein the addressable and reserved storage space is located remotely from the at least one end user, and further comprising:
   storing the particular advertising data in the addressable and reserved storage space;
   providing a communications interface between the addressable and reserved storage space and the at least one end user;

receiving, via the communications interface, instructions from the at least one end user to store user selectable digital media content in at least one storage unit;

storing the user selectable digital media content in the at least one storage unit;

accessing the particular advertising data stored in the addressable and reserved storage space;

merging the particular advertising data with the user selected digital media content to create combined digital media content; and delivering the combined digital media content to the at least one end user on demand.

60. The method of claim 46, further comprising:

decoding control data associated with the particular advertising data;

processing the control data to control selection of the particular advertising data; and storing the particular advertising data is said addressable and reserved storage space.

61. The method of claim 60, wherein the control data comprises a key word.

62. The method of claim 46, wherein the addressable and reserved storage space is located within a first end user receiver device, and further comprising:

identifying a second end user receiver device as associated with the first end user receiver device using a central control unit; and managing delivery of the particular advertising data to the second end user receiver device using the central control unit.

63. The method of claim 46, further comprising:

storing user selectable digital media content in at least one storage device;

storing the particular advertising data in the addressable and reserved storage space;

accessing the particular advertising data from the at least one addressable and reserved storage space; and merging the particular advertising data with the user selectable digital media content;

wherein said making comprises presenting the particular advertising data during playback of the user selectable digital media content.

64. The method of claim 63, wherein the user selectable digital media content is video on demand content.

65. The method of claim 46, wherein the program selectable digital advertising data comprises multi-formatted data comprising a plurality of advertising formats, and further comprising:

processing the multi-formatted advertising data to produce particular advertising data that is suitable for targeting to the at least one end user based upon said suitability data associated with the at least one end user;

wherein the particular advertising data is stored is said addressable and reserved storage space and wherein said making comprises presenting the particular advertisement to the at least one end user.

\* \* \* \* \*